US012715147B2

(12) United States Patent
Kim

(10) Patent No.: US 12,715,147 B2
(45) Date of Patent: Aug. 25, 2026

(54) LONG-STROKE AND FORCE-CONTROL PARALLEL GRIPPER

(71) Applicant: Roboligent, Inc., Austin, TX (US)

(72) Inventor: Bongsu Kim, Austin, TX (US)

(73) Assignee: Roboligent, Inc., Austin, TX (US)

( * ) Notice: Subject to any disclaimer, the term of this patent is extended or adjusted under 35 U.S.C. 154(b) by 1070 days.

(21) Appl. No.: 17/758,758

(22) PCT Filed: Jan. 19, 2021

(86) PCT No.: PCT/US2021/013913
§ 371 (c)(1),
(2) Date: Jul. 13, 2022

(87) PCT Pub. No.: WO2021/150493
PCT Pub. Date: Jul. 29, 2021

(65) Prior Publication Data

US 2023/0065554 A1 Mar. 2, 2023

Related U.S. Application Data

(60) Provisional application No. 62/963,659, filed on Jan. 21, 2020.

(51) Int. Cl.
*B25J 15/04* (2006.01)
*B25J 15/02* (2006.01)

(52) U.S. Cl.
CPC ....... *B25J 15/0475* (2013.01); *B25J 15/0286* (2013.01)

(58) Field of Classification Search
CPC .................................................. B25J 15/0475
See application file for complete search history.

(56) References Cited

U.S. PATENT DOCUMENTS

| | | | | | |
|---|---|---|---|---|---|
| 4,613,277 | A * | 9/1986 | Guay | B25J 15/0475 294/902 |
| 4,621,409 | A * | 11/1986 | Weixel | B23Q 3/15553 483/69 |
| 8,602,470 | B2 * | 12/2013 | Bieler | B25J 15/0475 294/207 |
| 9,975,253 | B2 * | 5/2018 | De Castelbajac | B25J 15/0475 |
| 2017/0066141 | A1 | 3/2017 | Yokoyama et al. | |

FOREIGN PATENT DOCUMENTS

| | | | | | |
|---|---|---|---|---|---|
| DE | 102016116191 | A1 * | 3/2018 | B25J 15/0286 |
| EP | 2607029 | A1 * | 6/2013 | B25J 15/0475 |
| JP | H09109081 | | 4/1997 | |
| JP | H09109081 | A * | 4/1997 | |

OTHER PUBLICATIONS

The PCT Search Report and Written Opinion mailed May 14, 2021 for PCT Application No. PCT/US21/13913, 16 pages.

* cited by examiner

*Primary Examiner* — Thomas E Lazo
(74) *Attorney, Agent, or Firm* — Lee & Hayes, P.C.

(57) ABSTRACT

A robotic system including a long-stroke and force-control parallel gripper. The parallel gripper may include an electric motor and siding mechanism to allow the length of the stroke of the fingers to be greater than the distance traveled. The parallel gripper also includes interchangeable fingers that may be engaged and disengage by the robotic system using a secured finger housing and latching mechanism.

20 Claims, 33 Drawing Sheets

LONG-STROKE AND FORCE-CONTROL PARALLEL GRIPPER

CROSS-REFERENCE TO RELATED APPLICATION(S)

This application is a U.S. national stage application under 35 USC § 371 of International Application No. PCT/US21/13913 filed on Jan. 19, 2021 and entitled "LONG-STROKE AND FORCE-CONTROL PARALLEL GRIPPER, which claims priority to U.S. Provisional Application No. 62/963,659 filed on Jan. 21, 2020 and entitled "LONG-STROKE AND FORCE-CONTROL PARALLEL GRIPPER," which are incorporated herein by reference in their entirety.

BACKGROUND

Today, there is increasing demand for collaborative robotic applications and system that require precisely controlled force-based interactions. For example, force-sensitive industrial tasks such as sanding, polishing, and inventory management for fragile items increasingly rely on machines and automated systems. However, most existing robotic gripper systems provide inadequate support and functionality to provide sensitive force-based interactions, are highly expensive, and require operator free work environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
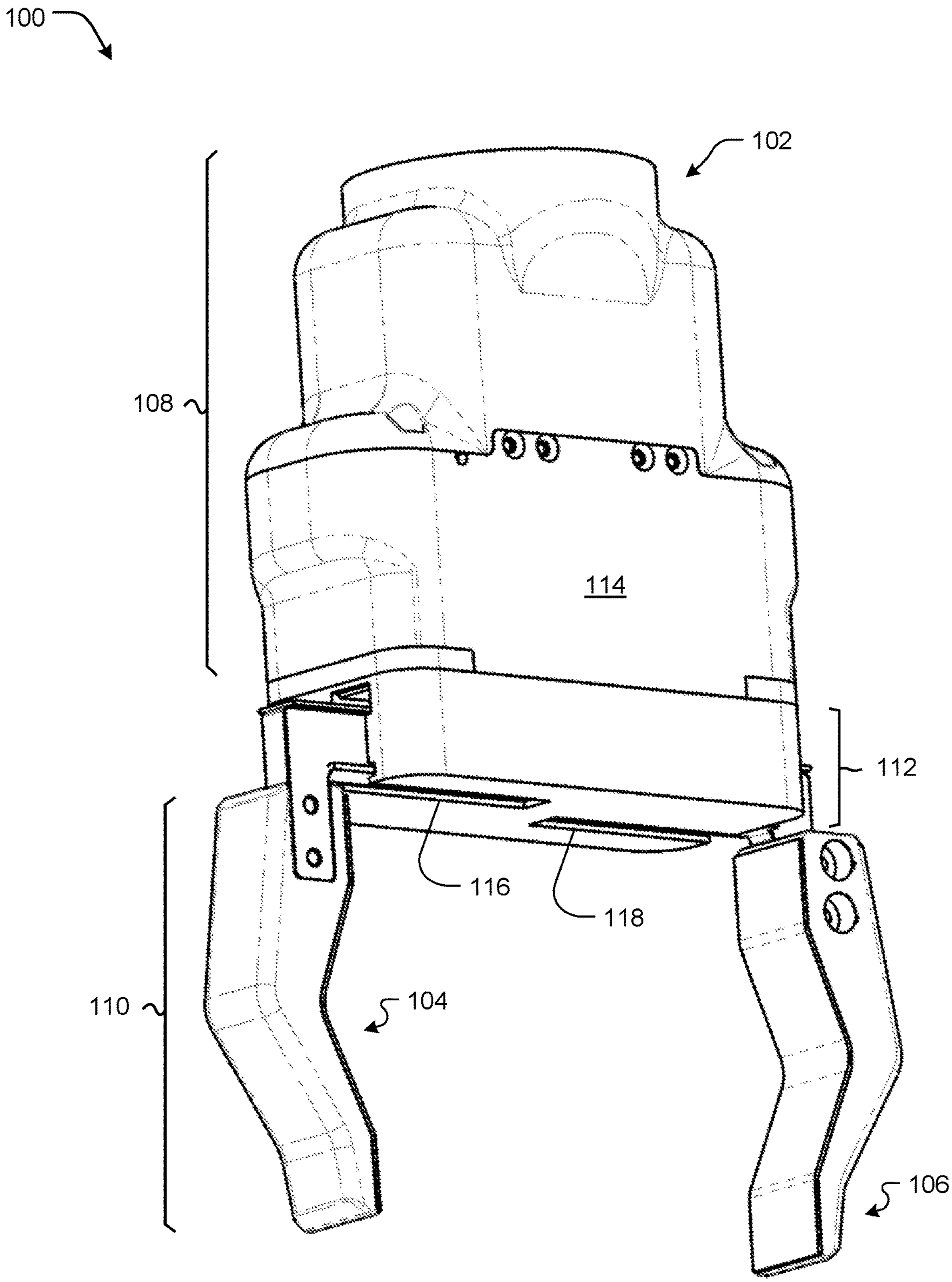
FIG. 1 illustrates an example parallel gripper with fingers in an open position according to some implementations.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Described herein are implementations and embodiments of a long-stroke and force-control parallel gripper. In general, a robotic gripper is a device that may be attached to the end of robotic manipulator or robotic arm and holds an object to be manipulated. There are a variety of types of grippers based on the types of kinematic mechanisms and motive power sources. Parallel grippers powered by electric motors are one of the popular types. The parallel gripper discussed herein has two fingers parallelly attached at a sliding mechanism so that the fingers close or open to hold or release an object.

One characteristic of a parallel gripper is the length of the stroke that the two fingers travel. The length of the stroke determines the minimum and maximum size of objects that the gripper and/or fingers are capable of grasping. In some cases, the travel length of the fingers is determined in part by the length of the sliding mechanism sitting at the main body of a gripper. A longer stroke may be achieved, in some implementations, by designing a longer sliding mechanism and a larger gripper body. However, implementing a larger gripper may reduce the versatility of a robotic arm by increasing the likelihood of interference between the gripper and environment and reducing a maximum payload of the robotic arm due to an increased weight of the gripper. Therefore, a longer stroke in a smaller gripper body, as discussed herein, is preferable over conventional larger gripper bodies.

For instance, in some implementations, the robotic gripper may be equipped with a linear bearing mechanism having a set of guide rails and two or more carriages. For example, a first carriage may be positioned to engage with a top surface of a drive pully of the linear bearing mechanism and a second carriage may be positioned to engage with a bottom surface of the driver pully. The first and second carriages may be engaged with the drive pully and corresponding guide rails, such that the carriages move in opposing directions (e.g., right and left) when the linear bearing mechanism is opening or closing the fingers. In these implementations, when individual carriages of the linear bearing travel to the end of a corresponding guide rail, a finger mounting structure of each carriage may be configured to fully open or close a corresponding finger. In some cases, when the gripper fully opens the finger mounting structures, the driving pulley may rotate counterclockwise and a timing belt may rotate accordingly. The carriages then slide to the right and the left (e.g., in opposing directions), respectively to close the finger mounting structures. As the carriages slide to the other ends of the guide rail, the gripper fully closes the finger mounting structure. In these examples, by using opposing dual carriages, the length of the grasping stroke of the gripper is twice the total travel length of a single carriage resulting in a longer stroke when compared with the body size of the gripper.

The gripper, discussed herein, may also provide a system for robotic removal of the fingers. In this manner, the gripper may provide for an increased diversity of gripping fingers for the handling of a larger range of objects than conventional robotic arms that require manual replacement or removal of the fingers.

For example, in some implementations, the gripper, discussed herein, may be configured with a spring-loaded latch that is actuatable via a mechanical release trigger. In some cases, fingers of various form factors, such as those illustrated below with respect to FIGS. 1-30, may be stored in a fixed finger housing that allows for system or machine implemented finger replacements or changes. In some cases, the fixed finger housing may include openings or cavities for receiving the fingers. Along a portion of the surface of each cavity, the housing may include a latch pressing component. For example, the latch pressing component may extend over a portion of an interior wall of the cavity such that a second portion of the cavity is unobstructed by the latch pressing component. The robotic system may align the fingers with the second portion of the cavities, insert the fingers, then slide the fingers in a horizontal direction to engage the latch pressing component. The latch pressing component may then release the latch, by, for instance, engaging the spring on each finger. In this manner, the robotic arm may disengage from the fingers via an upward movement.

In some cases, the robotic arm may then engage the robotic gripper with alternative fingers by identifying a second fixed finger housing and aligning one or more alignment shafts of the gripper with one or more corresponding alignment slots on a top surface of the replacement fingers. The robotic arm may then engage the alignment shafts with the alignment slots, thereby allowing the fingers to be moved horizontally to disengage the latch pressing component of the second fixed finger housing. The robotic arm may then disengage with the second fixed finger housing by removing the fingers in an upward direction.

In some cases, the process of engaging and disengaging the fingers of the robotic gripper may be performed with respect to a camera system equipped with one or more sensor systems (e.g., image devices) and/or projectors (e.g., illuminators, emitters, and the like). In other cases, the robotic fingers, gripper, and/or fixed finger housing may be equipped with one or more sensors, such as contact sensors, magnetic coupling sensors, or the like that produce signals indicative of whether or not the fingers are engaged or disengaged with the latch pressing component.

The gripper, discussed herein, may also have increased the versatility when compared with conventional grippers by having a force-regulated grasping mechanism that allows the gripper to grasp not only rigid objects but also soft or easily crushable objects such as produce, paper-based packages, ceramics, glass products, and the like. For example, in some implementations, the robotic gripper and finger control system may be configured to provide force control allowing the gripper to grasp soft or fragile objects without the use of a force sensor along the fingers of the gripper allowing the fingers to be replaceable or removable without an electrical coupling to the force sensors that would otherwise be required in conventional force sensing systems.

In some cases, the force control system may include a motor, timing pulleys and belts, linear bearings, and finger mounting structures. For example, two linear bearings (e.g., one for each finger) may each include a guide rail and a carriage. The guide rails of each linear bearing may be attached to a body structure of the gripper in a way that the two bearings are parallel and facing each other. In some cases, the finger mounting structure are fixed at the bearing carriages and a first closed-loop timing belt may be tensioned between the parallelly placed linear bearings by two pulleys (e.g., a driving pulley and an idler pulley). The pulleys may be positioned in parallel with the linear bearings. Each side of the pully belts may be anchored to each of the carriage by a clamping cap. The two pulleys may also be connected to the body structure via corresponding shafts, such that the pulleys may rotate freely with respect to the body structure.

In this example, a pinion pulley attached to the output shaft of the motor may be physically coupled to a spur pulley via a second closed-loop timing belt. The number of teeth of the spur pully may be larger than that of the pinion pulley to amplify the motive force from the motor, and the ratio of the number of teeth may ranges from 1:2 to 1:10, in some implementations. To reduce the overall size of the transmission, the number of teeth of the pinion pulley is reduced below a threshold. In some cases, the threshold may be determined based on a curvature of the second timing belt. The spur pulley may be rigidly and concentrically connected to the driving pulley such that the spur pulley and the driving pulley rotate together. The number of teeth of the driving pulley is desired to be close (e.g., within a threshold number) to that of the pinion pulley to increase the maximum grasping force of the gripper. The rotational motive force of the motor drives the driving pulley and timing belt via the spur pulley. The rotating belt causes the carriages to close or open the finger mounting structures. The combination of the timing belts and pulleys with low gear reduction ratio reduces or lowers friction, thus allowing a torque from the motor to be delivered as grasping force transparently. Accordingly, by controlling motor torque, the grasping force can be regulated by the system. For example, in this implementation, the grasping force can be $$GN = \frac{\left(\frac{MT * NTS}{NTP}\right)}{rD}$$

where, GN is the grasping force, MT is the motor torque, NTS is the number of teeth of the spur pulley, NTP is the number of teeth of the pinion pulley, and rD is the radius of the driving pulley in millimeters (mm). For instance, in one specific example, the gripper may have approximately 83 N·mm of maximum motor torque, 48 teeth of spur pulley, 12 teeth of pinion pulley, and 5 mm of driving pulley radius resulting in 66 newtons (N) of maximum grasping force.

FIG. 1 illustrates an example 100 parallel gripper 102 with fingers 104 and 106 in an open position according to some implementations. The parallel gripper 102 includes a body portion 108, a finger portion 110 (including the fingers 104 and 106), and an end cover portion 112. The body portion 108 includes a body structure 114 where internal components are grounded. The finger portion 110 include at least two fingers 104 and 106 but may include additional fingers in other implementations.

In this example, the fingers 104 and 106 may be configured to open and close with respect to the end cover portion 112, as illustrated below with respect to FIG. 2. For instance, the fingers 104 and 106 may move in opposing directions (e.g., towards each other) along the slots 116 and 118 along the bottom surface of the end cover portion 112.

Figure 2:
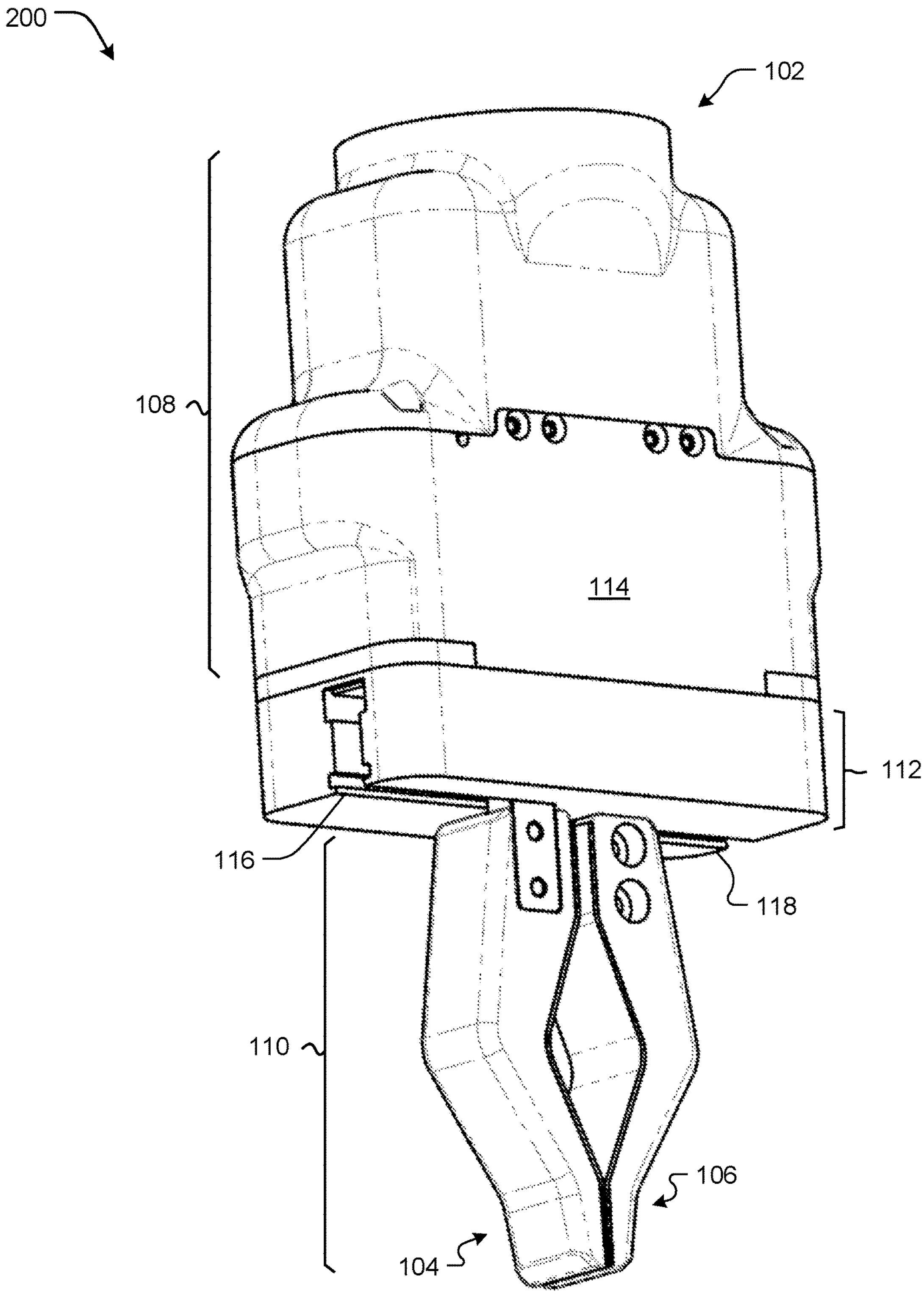
FIG. 2 illustrates an example parallel gripper with fingers in a closed position according to some implementations.

FIG. 2 illustrates an example 200 parallel gripper 102 with fingers 104 and 106 in a closed position according to some implementations. As illustrated, the fingers 104 and 106 have moved together along the slots 116 and 118. For example, the body structure 114 of the gripper 102 may house an electric motor with a control computing device or system. The motor may generate motive force to open and close the finger portion 110 via a transmission mechanism to transfer the motive force from the motor to a finger mounting structure and a linear sliding mechanism to cause the fingers 104 and 106 to move along the slots 116 and 118.

In some cases, the motor may be a rotary-type brushless direct-current (DC) motor to provide torque controllability by regulating electric current. The transmission mechanism may include timing belts and pulleys to transparently deliver the torque of the motor to the finger mounting structure, as will be described in more detail below. The linear sliding mechanism may include linear guide bearings that consist of carriages and guide rails that support all directional force and moment loads except the direction of linear motion, that will all so be described in more detail below.

Figure 3:
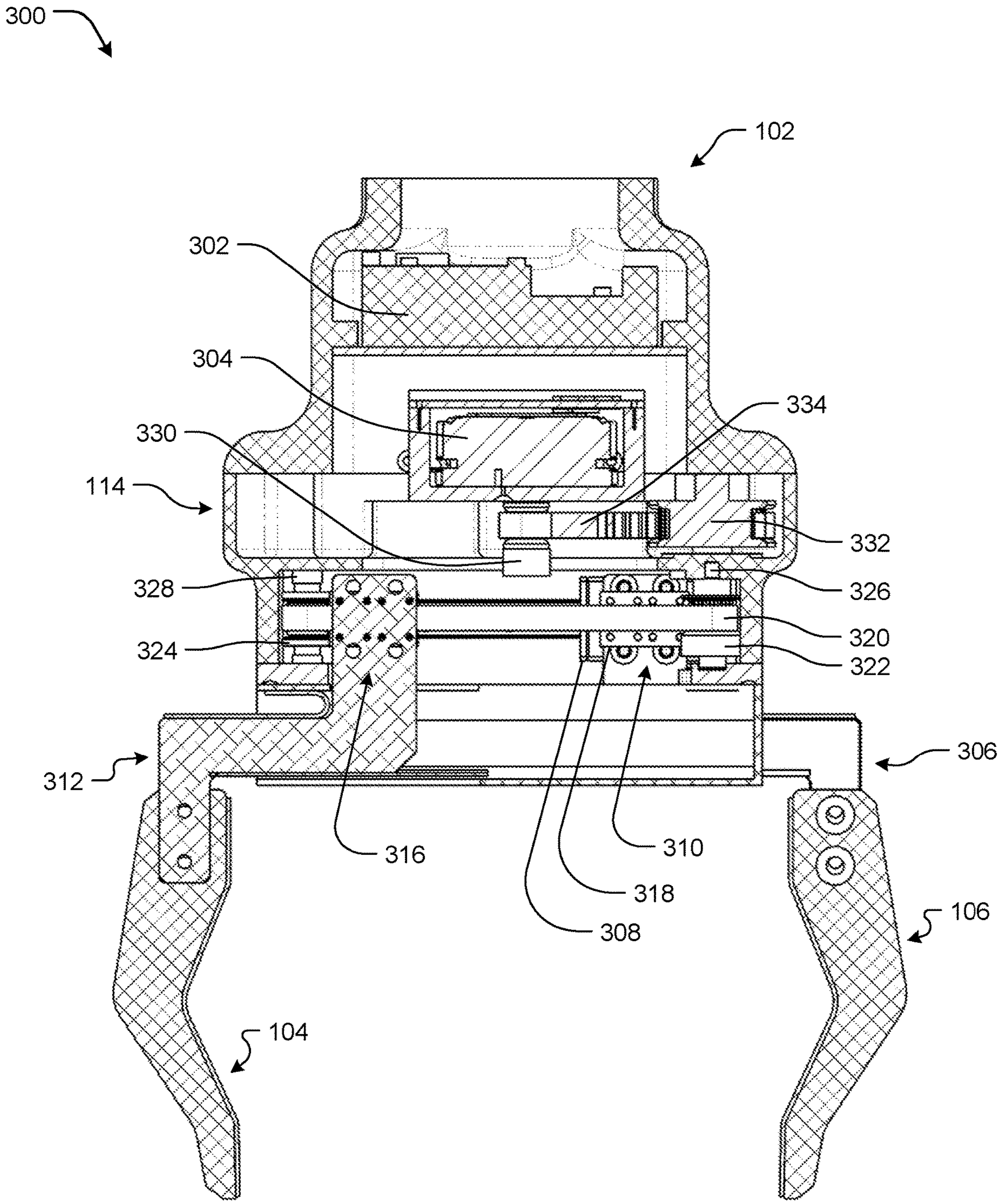
FIG. 3 illustrates an example cross-section view of a parallel gripper with fingers in the open position according to some implementations.

FIG. 3 illustrates an example 300 cross-section view of a parallel gripper 102 with fingers 104 and 106 in the open position according to some implementations. As illustrated and discussed above, a finger control system may include a control computing device 302 and a stationary portion of the motor 304 grounded at the body structure 114. In the illustrated example, the finger 106 is coupled to a finger mounting structure 306 and the finger mounting structure 306 is coupled to a bearing carriage 308 via root portions 310 of the finger mounting structure 306. Likewise, the finger 104 is coupled to a finger mounting structure 312. The finger mounting structure 312 is coupled to a bearing carriage (illustrated in FIG. 4 below as 314) via root portions 316 of the finger mounting structure 312.

In the current example, the bearing carriages 308 and 314 are arranged in parallel along linear bearings associated with a first closed-loop timing belt 320. The first closed-loop timing belt 320 may be tensioned between a first pulley 322 and a second pully 324, such as a drive pully and an idler pully. In this example, the first pulley 322 and the second pully 324 are configured in parallel with the linear bearings, such as the illustrated with respect to bearing carriage 308 of the finger 106. The first pulley 322 and the second pully 324 may be physically coupled or connected to the body structure 114 and bearings, respectively via shafts 326 and 328, such that the first pully 322 and the second pully 324 may rotate freely with respect to the body structure 114. In some cases, each side of the first closed-loop timing belt 320 may be anchored to the bearing carriage 308 and 314 by a clamping cap, such as illustrated clamping cap 318 associated with the finger 106.

In some implementations, a pinion pulley 330 may be coupled to an output shaft of the stationary portion of the motor 304. The pinion pulley 330 may also be coupled to a spur pulley 332 via a second closed-loop timing belt 334. The number of teeth of the spur pulley 332 is larger than that of the pinion pulley 330 to amplify the motive force from the motor 304. For example, the ratio of the number of teeth between the spur pulley 332 and the pinion pulley 330 may be between 1:2 to 1:10. In some cases, to reduce the overall size of the transmission, the number of teeth of the pinion pulley 330 may be reduced below a threshold. The threshold may be selected or determined based at least in part on a curvature of the second closed-loop timing belt 334. In some cases, the spur pulley 332 is rigidly and concentrically coupled to the driving pulley, e.g., the first pulley 322, such that the spur pulley 332 and the first pully 322 rotate together. The number of teeth of the first pulley 322 (e.g., the drive pulley) is desired to be close (e.g., within a threshold number) to that of the pinion pulley 330 to maximize the grasping force of the gripper 102.

The arrangement and configuration of the pulleys 322, 324, 330, and 332 as well as the belts 320 and 334 allow the rotational motive force of the motor 304 to open and close the fingers 104 and 106. For example, the rotation of the first closed-loop timing belt 320 causes the bearing carriages 308 and 314 coupled at the opposite side of the first closed-loop timing belt 320 to linearly slide in the opposing directions to close or open the fingers 104 and 106. Further, the arrangement and configuration of the pulleys 322, 324, 330, and 332 and the belts 320 and 334 allows torque from the motor 304 to be delivered as grasping force of the fingers 104 and 106 transparently. In this manner, by controlling motor torque, the grasping force can be directly regulated.

Figure 4:
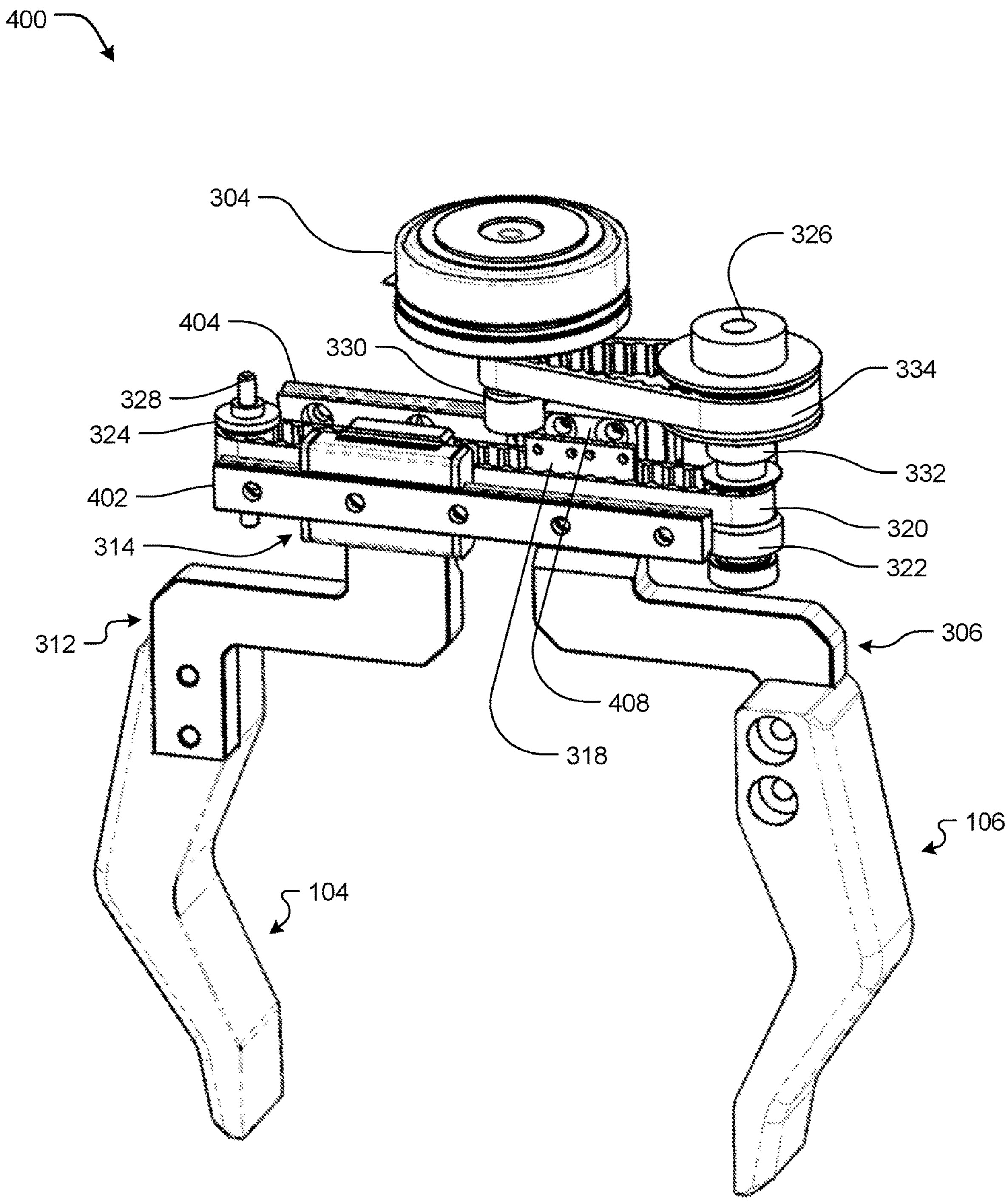
FIG. 4 illustrates an example internal mechanism of a parallel gripper with fingers in the open position according to some implementations.

FIG. 4 illustrates an example 400 internal mechanism of a parallel gripper 102 with fingers 104 and 106 in the open position according to some implementations. In the current example, the motor 304, pulleys 322, 324, 330, and 332, belts 320 and 334, carriages 314 and 318, and finger mounting structures 306 and 312 as discussed above with respect to FIG. 3 are shown. It should be understood that the finger control system shown in FIG. 4 operates as discussed above with respect to FIG. 3. Additionally, as shown in this example, the linear bearings includes guide rails 402 and 404 and carriages 306 and 312. The guide rails 402 and 404 of the bearings are physically coupled to the body structure 114 such that the two bearings are parallel and facing each other, as illustrated, to allow the fingers 104 and 106 to move in opposing directions.

Figure 5:
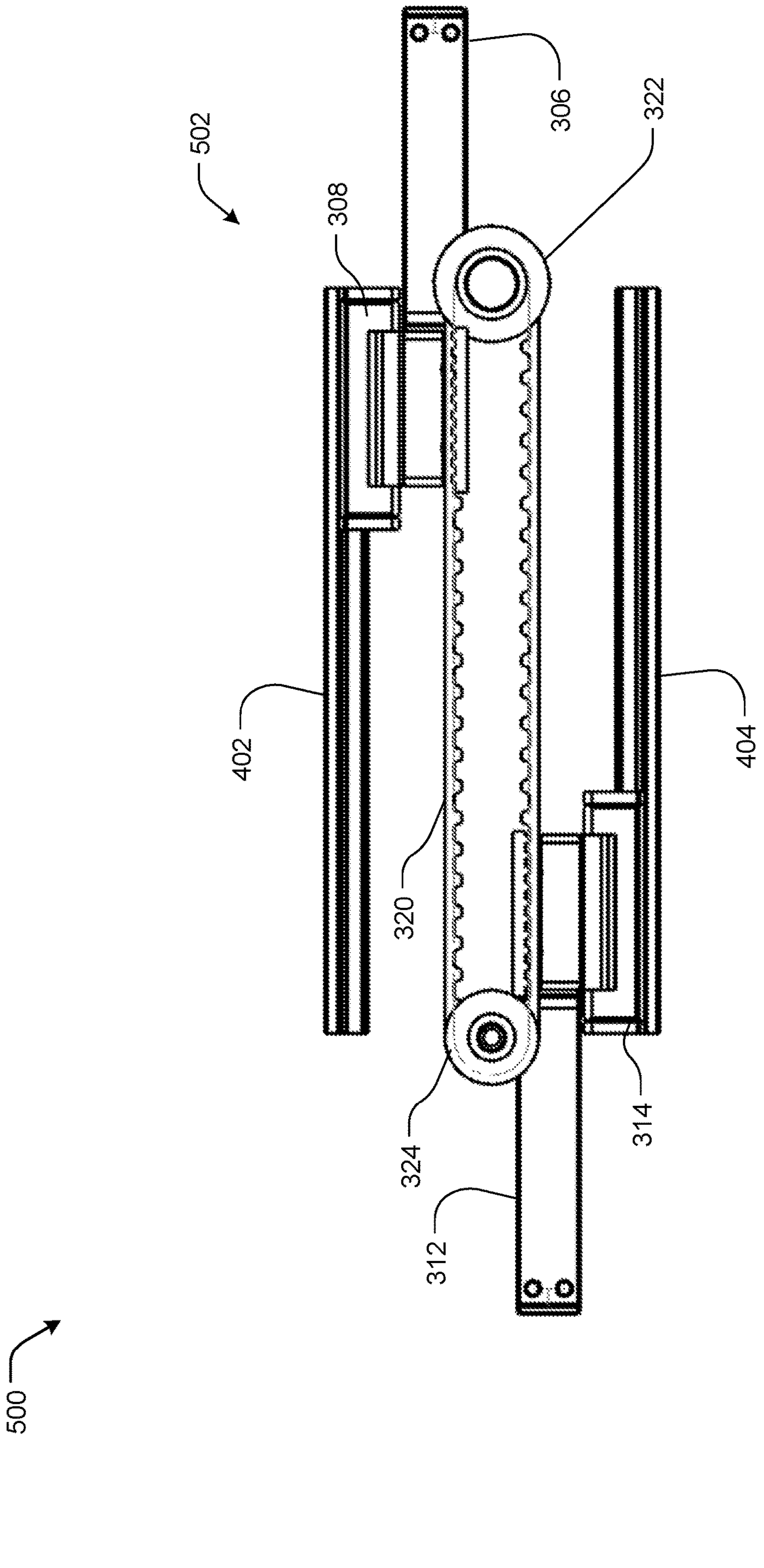
FIG. 5 illustrates an example top view of an internal mechanism of a parallel gripper with fingers in the open position according to some implementations.
Figure 6:
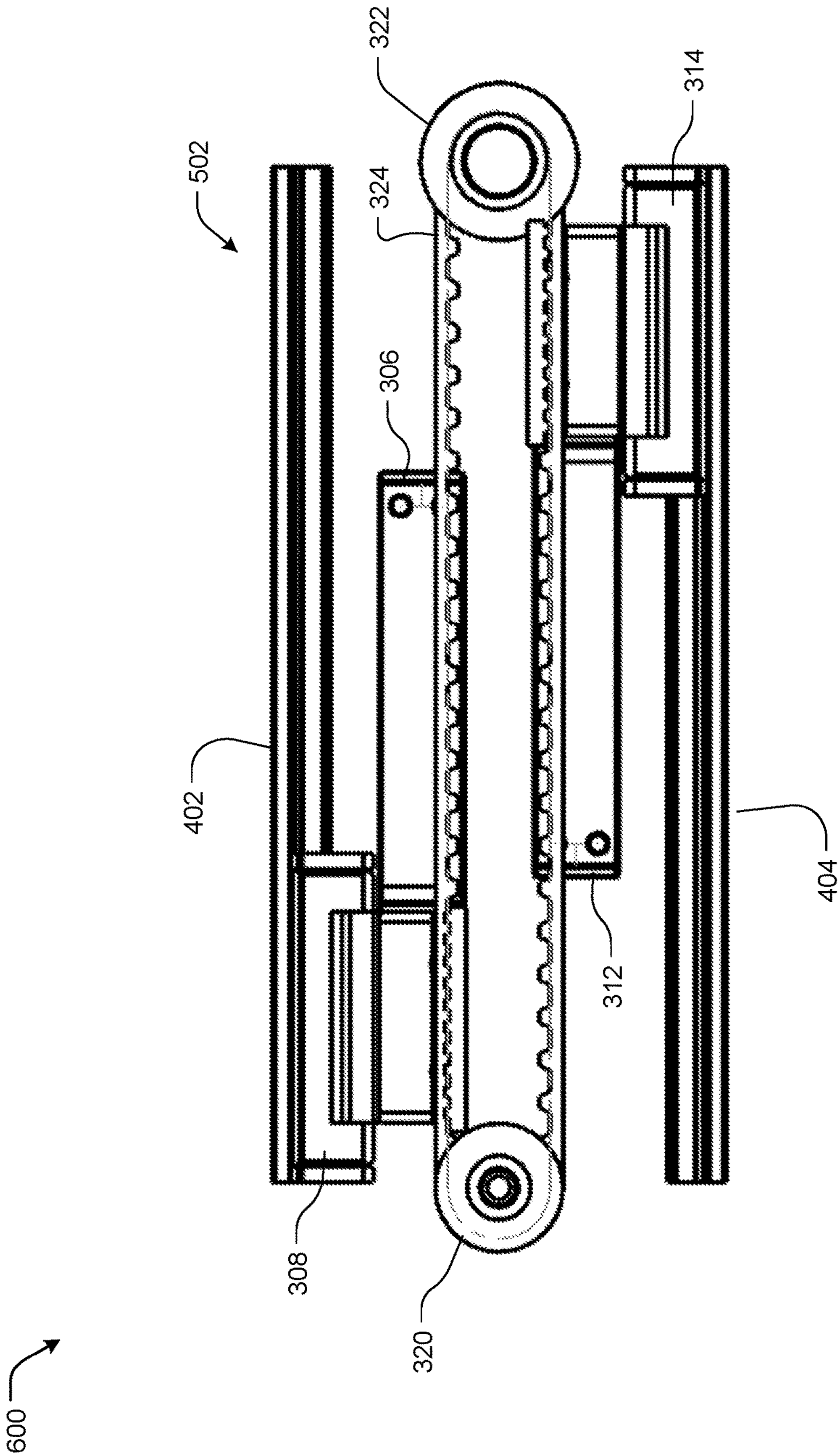
FIG. 6 illustrates an example top view of an internal mechanism of a parallel gripper with fingers in the closed position according to some implementations.

FIG. 5 illustrates an example 500 top view of an internal mechanism 502 of a parallel gripper 102 with fingers in the open position according to some implementations and FIG. 6 illustrates an example 600 top view of an internal mechanism 502 of a parallel gripper 102 with fingers in the closed position according to some implementations. In the illustrated examples, the linear bearing mechanism 502 assists with increasing the overall stroke of the gripper 102 without increasing the overall size of the body structure 114. In this example, as each carriage 308 and 314 of the linear bearing travels between the ends of the guide rails 402 and 404, the finger mounting structures 306 and 312 are configured to fully open or close the fingers 104 and 106 (e.g., transition the finger 104 and 106 between the open position shown with respect FIG. 5 and the closed position shown with respect to FIG. 6).

Starting in the open position of FIG. 5, as the drive pulley 322 (e.g., the first pulley) and the idler pulley 324 (e.g. the second pulley) rotates counterclockwise, the first closed-loop timing belt 320 rotates accordingly, the carriage 308 slides to the left, and the carriage 314 slides to the right to close the finger mounting structures 306 and 312. When the carriage 308 and 314 slide to the other ends of the corresponding guide rail 402 and 404, the gripper 102 transitions to the closed position of FIG. 6. Accordingly, a length of the grasping stroke is twice the total travel length of the single carriage in a linear bearing resulting in a gripper 102 providing a longer stroke than the size of the body structure 114. For example, the illustrated internal mechanism 502 allows for a stroke length of 130 mm with 95 mm-long guide rails and for a stroke length of 170 mm with 115 mm-ling guide rails.

Figure 7:
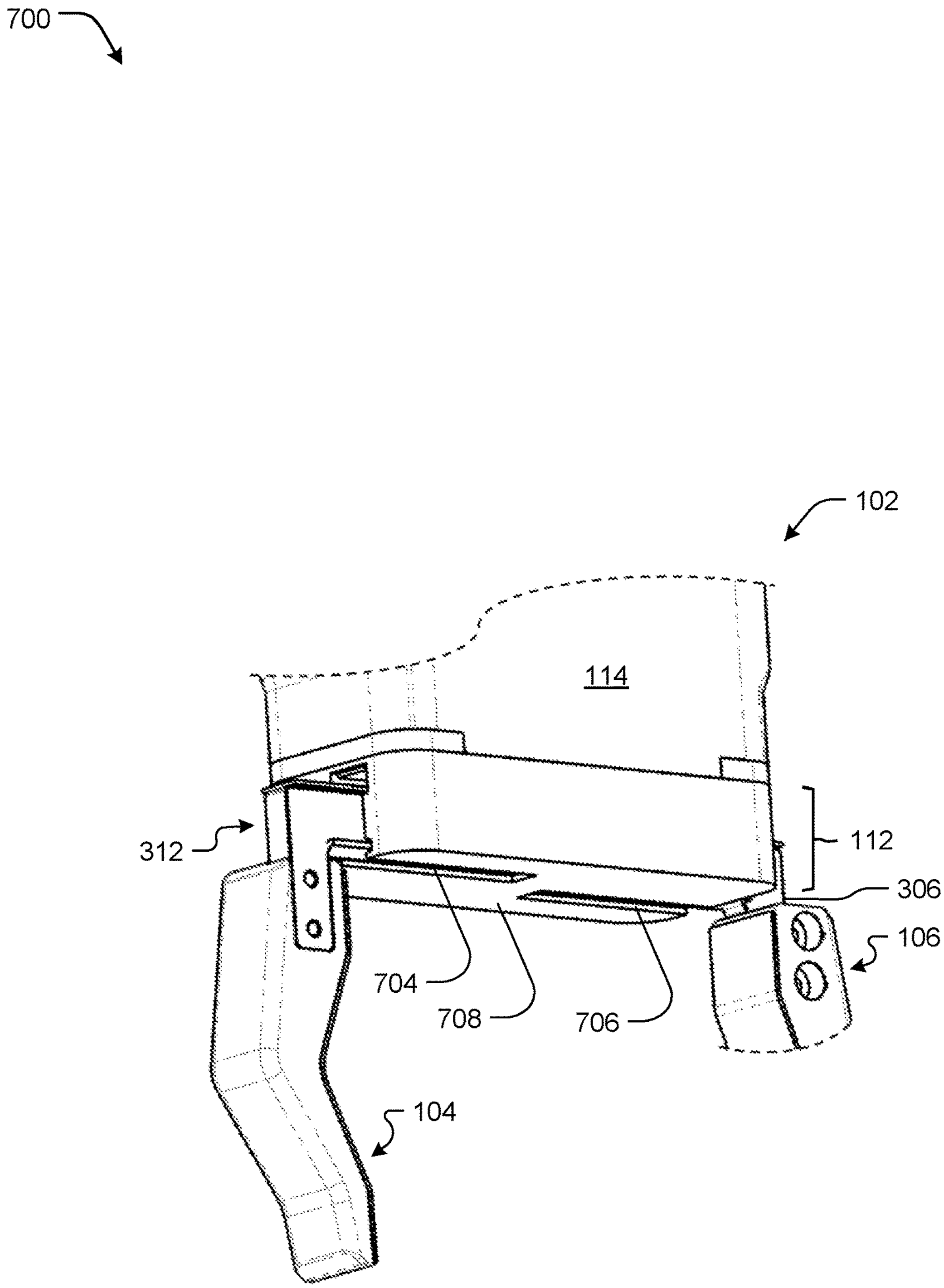
FIG. 7 illustrates an example pictorial view of the end cover portion of a parallel gripper of FIG. 1 with fingers in the open position according to some implementations.

FIG. 7 illustrates an example 700 of the end cover portion 112 of a parallel gripper 102 of FIG. 1 according to some implementations. In this example, the end cover portion 112 of the gripper 102 closes the opening holes of the gripper structure 114 around an area in which the finger mounting structures 306 and 312 travel. As illustrated, the gripper 102 has the fingers 104 and 106 in the open position. When the fingers 104 and 106 are closed by the motor, the finger mounting structures 306 and 312 move inward or towards each other along the corresponding slots 704 and 706 on the bottom surface of the outer cover portion 708 of the end cover portion 112.

Figure 8:
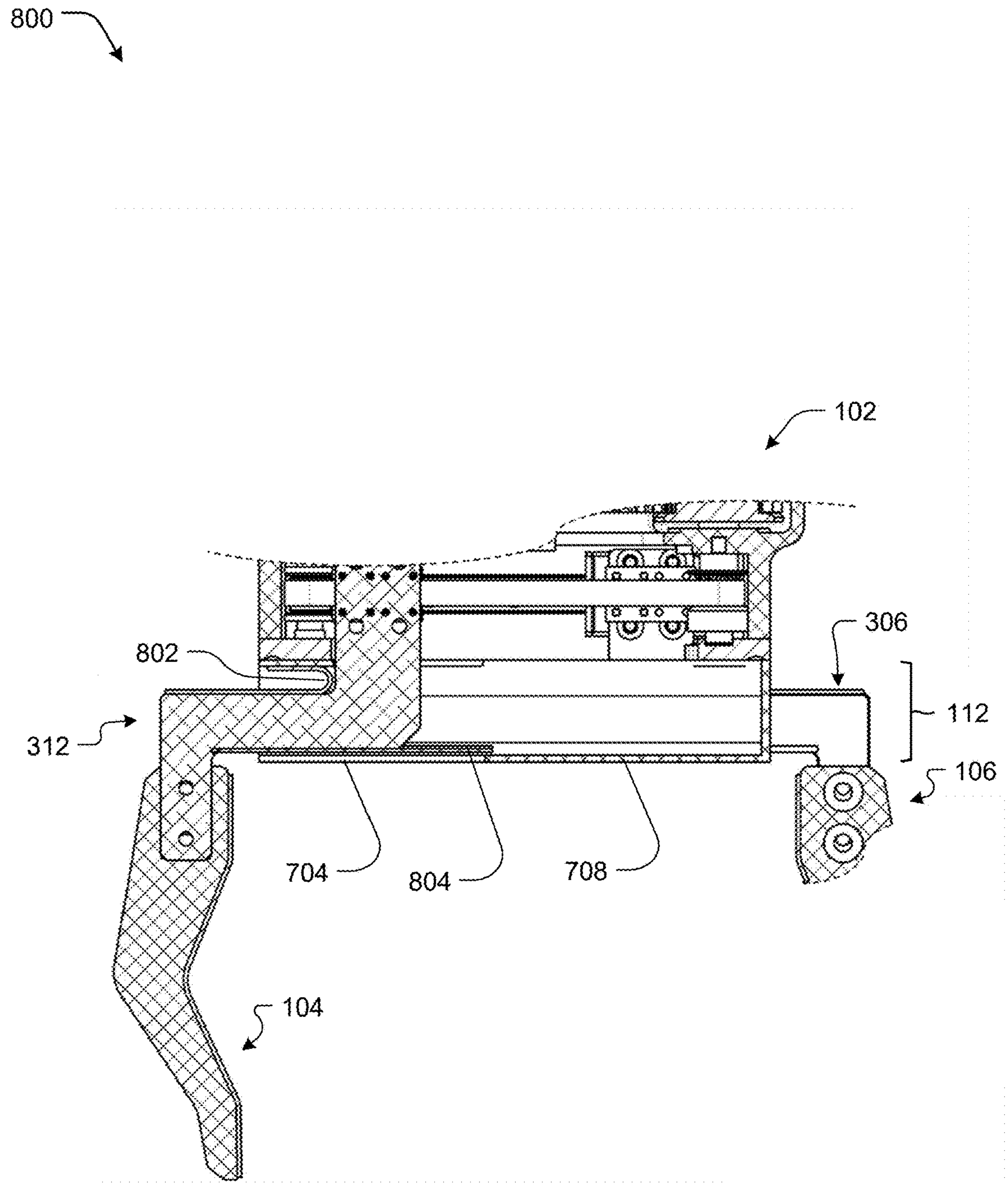
FIG. 8 illustrates example cross-section view of the end cover portion of a parallel gripper of FIG. 1 with fingers in the open position according to some implementations.
Figure 9:
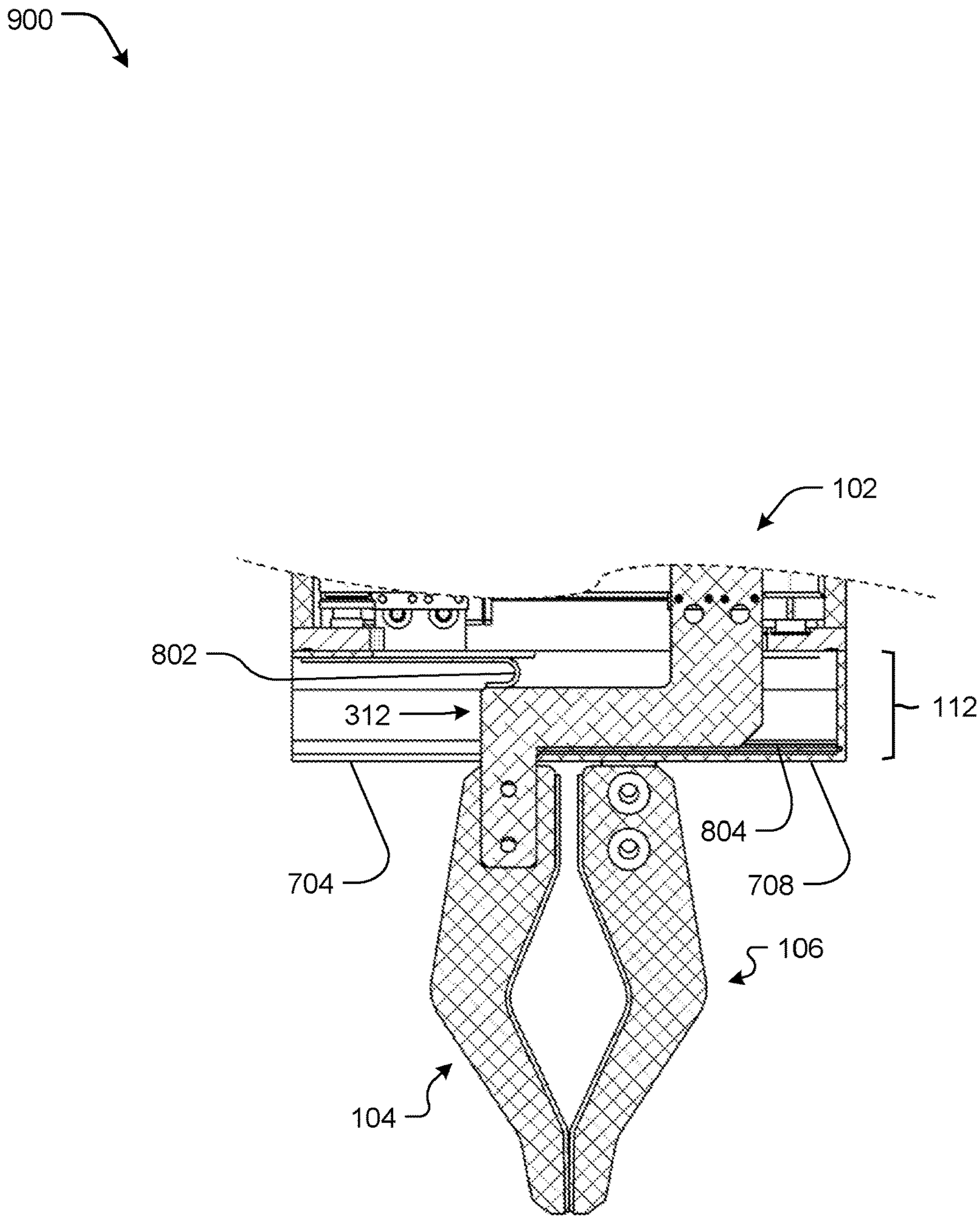
FIG. 9 illustrates an example cross-section view of the end cover portion of a parallel gripper of FIG. 1 with fingers in the closed position according to some implementations.

FIG. 8 illustrates an example cross-section view 800 of the end cover portion 112 of a parallel gripper 102 of FIG. 1 with fingers in the open position according to some implementations and FIG. 9 illustrates an example cross-section view 900 of the end cover portion 112 of a parallel gripper 102 of FIG. 1 with fingers in the closed position according to some implementations. In this example, the finger 104 and the finger mounting structures 312 may move between the position illustrated with respect to FIG. 8 and the position illustrated with respect to FIG. 9. As shown, the slot 704 runs half the length of the outer cover portion 708 to allow the finger 104 to be received as the fingers 104 and 106 are closed, as shown in FIG. 9. A sliding cover 804 is attached to the finger mounting structure 312 and moves together with the finger mounting structure 312. The sliding cover 804 closes the slot 704 when the fingers are in the opened position. Alternatively, a flexible cover 802 is coupled to the finger mounting structure 312 at one end and a portion of the body structure 114 at the other, such that the flexible cover 802 unfolds as finger 104 moves to the open position and refolds as the finger 104 moves to the closed position. Similarly, the finger mounting structure 306 and the finger 106 may have a similar combination of sliding cover and flexible cover (not shown), as that of the finger 104.

Figure 10:
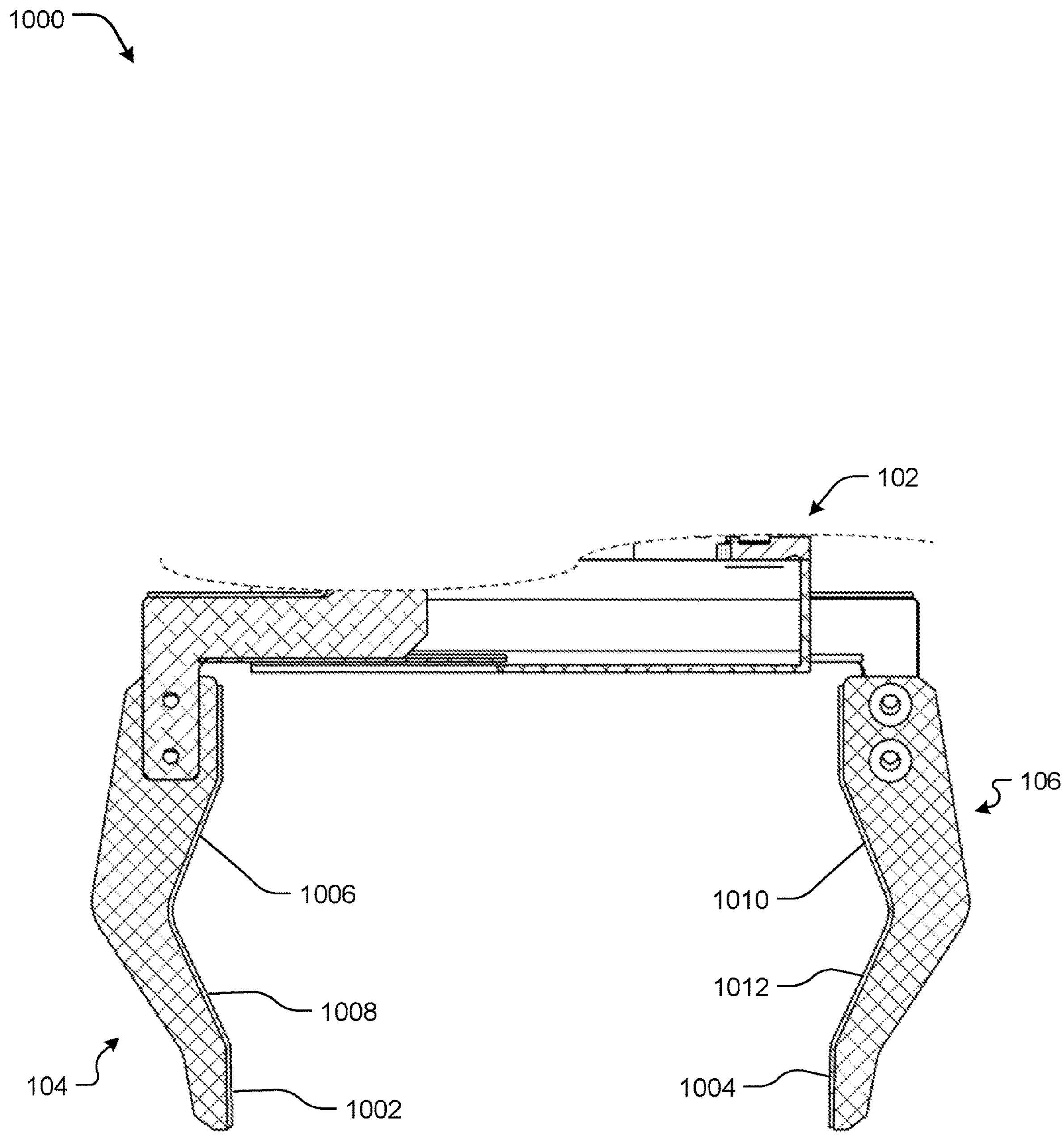
FIG. 10 illustrates example finger bodies of a parallel gripper according to some implementations.

FIG. 10 illustrates an example 1000 fingers 104 and 106 of a parallel gripper 102 according to some implementations. As illustrated, fingers 104 and 106 have surfaces 1002 and 1004 located at an end of a tip of the corresponding finger 104 or 106. The surfaces 1002 and 1004 are parallel to each other to provide a pinch grip (illustrated below with respect to FIG. 12) or pinching surface. The fingers 104 and 106 also include other convex surface portion 1006-1012 located substantially proximate to a middle of each finger 104 and 106 to provide a power grip (illustrated below with respect to FIG. 11) or power gripping surface. While FIGS. 1-10 illustrate a particular implementation of a finger 104 or 106 associated with the gripper 102, it should be understood that a variety of fingers may be used. For example, alternative finger implementations are shown with respect to FIGS. 13-30 below.

Figure 11:
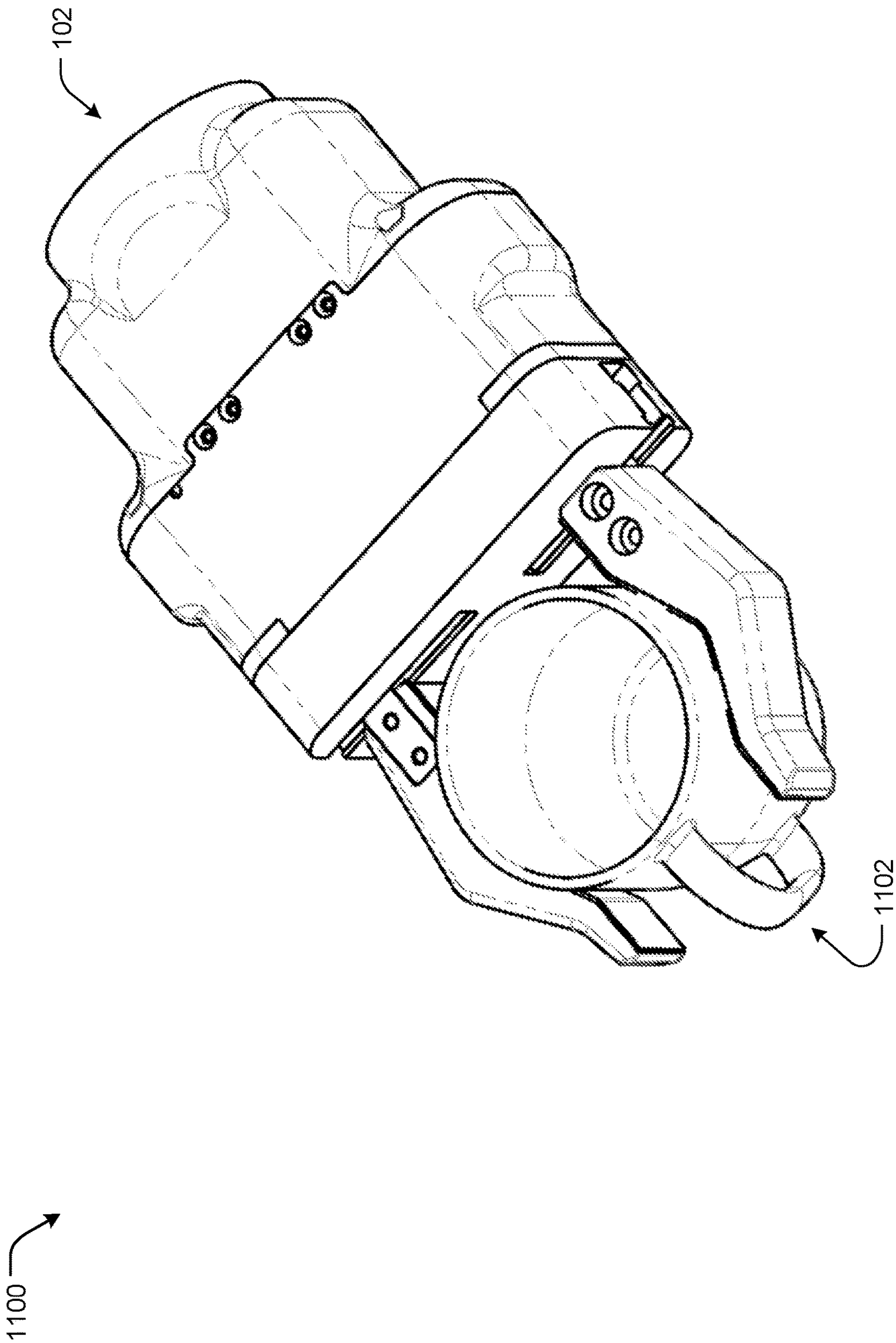
FIG. 11 illustrates an example power grip of a parallel gripper according to some implementations.

FIG. 11 illustrates an example 1100 of a power grip of a parallel gripper 102 according to some implementations. In this example, the gripper 102 has engaged a cup 1102 using the convex surface portion 1006-1012 of the two fingers 104 and 106. The convex nature of the surface portions 1006-1012 allow for a tight grip on wide or circular shaped objects.

Figure 12:
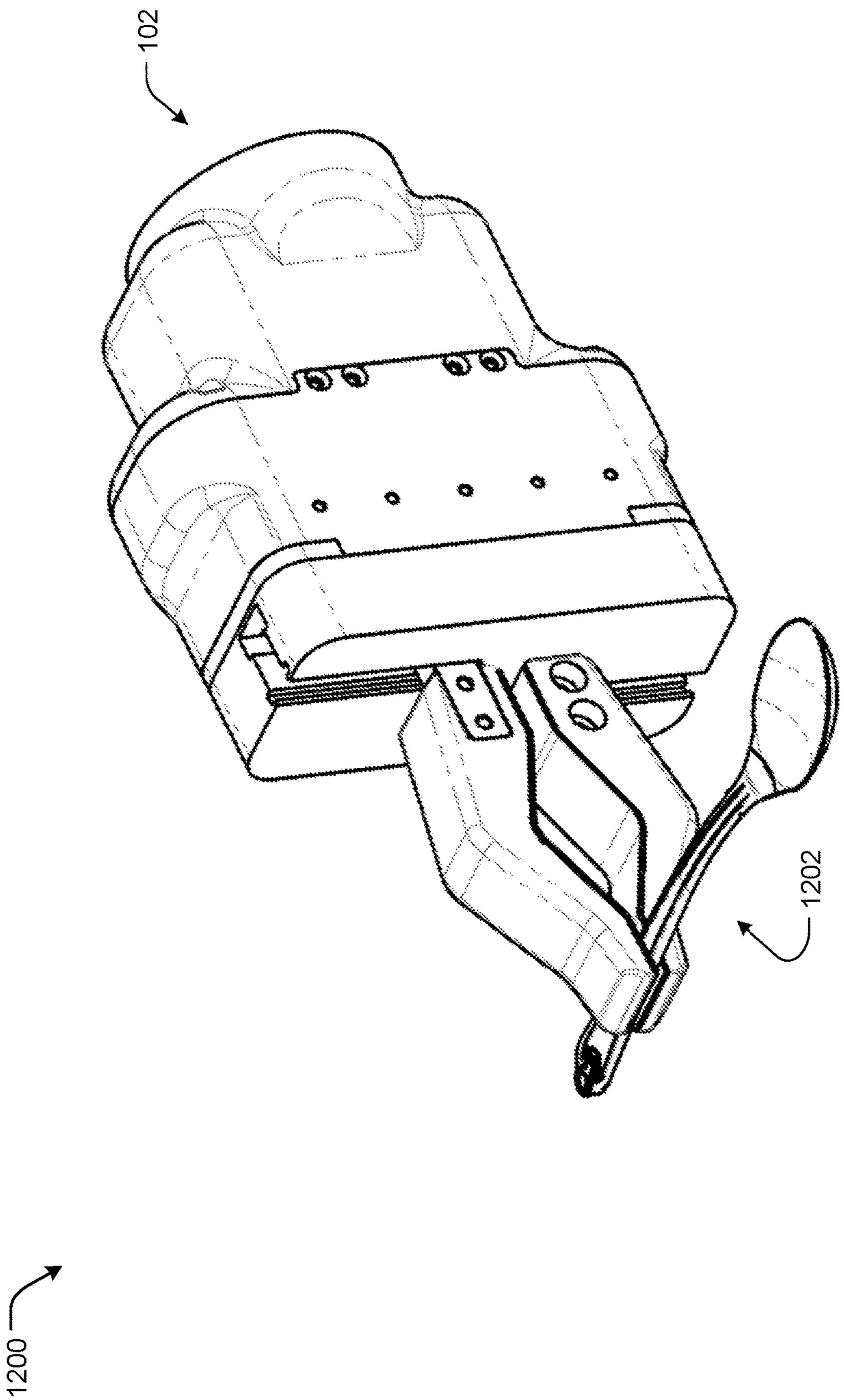
FIG. 12 illustrates an example pinch grip of a parallel gripper according to some implementations.

FIG. 12 illustrates an example pinch grip of a parallel gripper 102 according to some implementations. In this example, the gripper 102 has engaged a spoon 1202 using the flat parallel surface portion 1002 and 1004 of the two fingers 104 and 106. The parallel nature of the surface portions 1002 and 1004 allow for a tight grip on small, thin, and/or flat objects.

Figure 13:
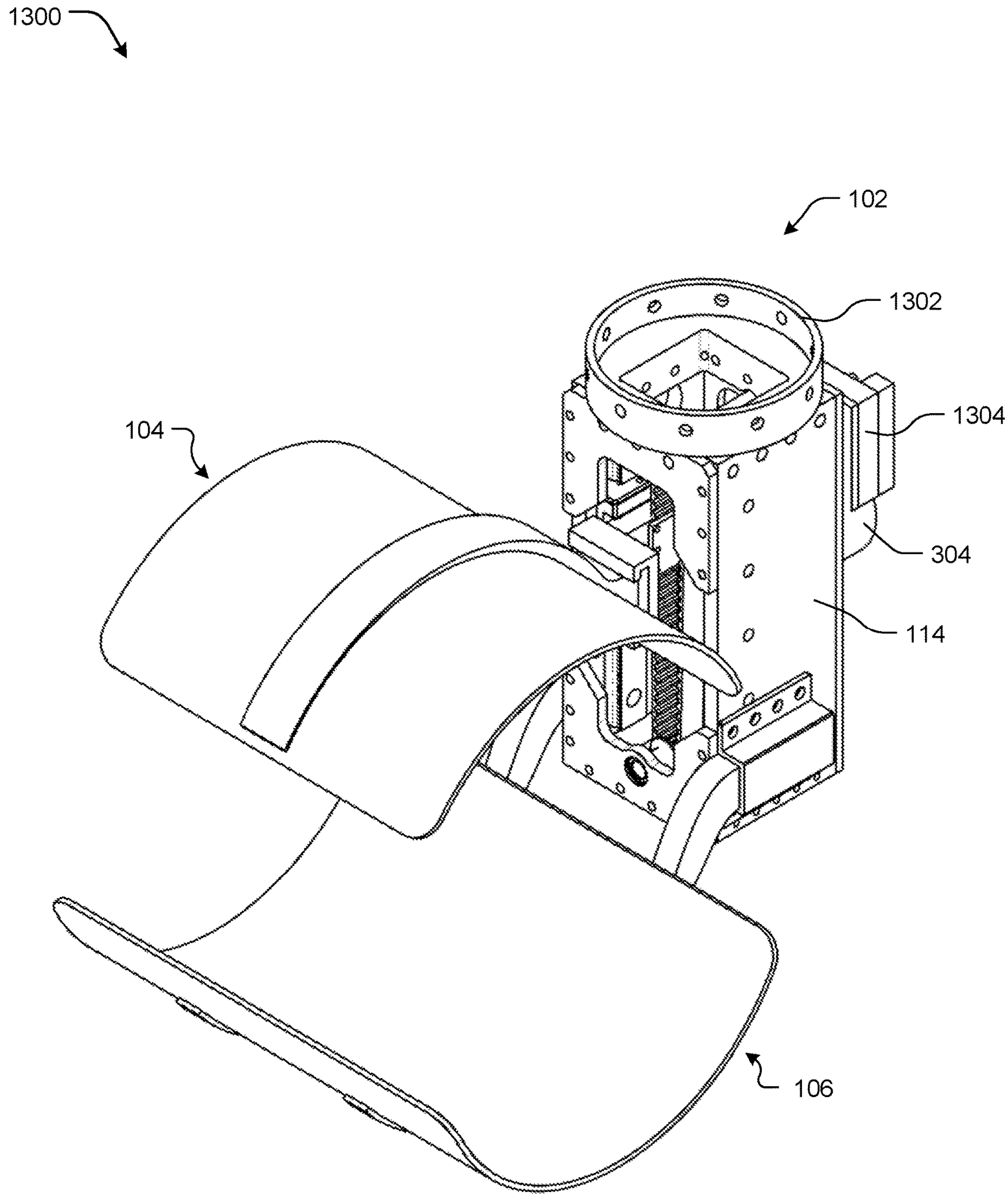
FIG. 13 illustrates an example parallel gripper with alternative fingers according to some implementations.

FIG. 13 illustrates an example 1300 of a parallel gripper 102 with alternative fingers 104 and 106 according to some implementations. In this example, the parallel gripper 102 has the same transmission mechanism as discussed above but has an alternation in the finger structure 104 and 106. The example gripper 102 also includes a gripper body 114, a connecting portion 1302 to a robot manipulator, electric motor 304, and control computing device 1304. The fingers 104 and 106, illustrated herein, are configured for lifting heavy objects, such as a portion of the human body including the upper and lower limbs, for instance, to assist in rehabilitation. In some cases, the fingers 104 and 106 may include a jaw, such as an upper jaw and a lower jaw. The load from a grasped object is intended to be exerted on the lower jaw 106 that is grounded at the gripper body 104 while the upper moving jaw 104 is intended to slide and press down the grasped object against the lower jaw 106.

Figure 14:
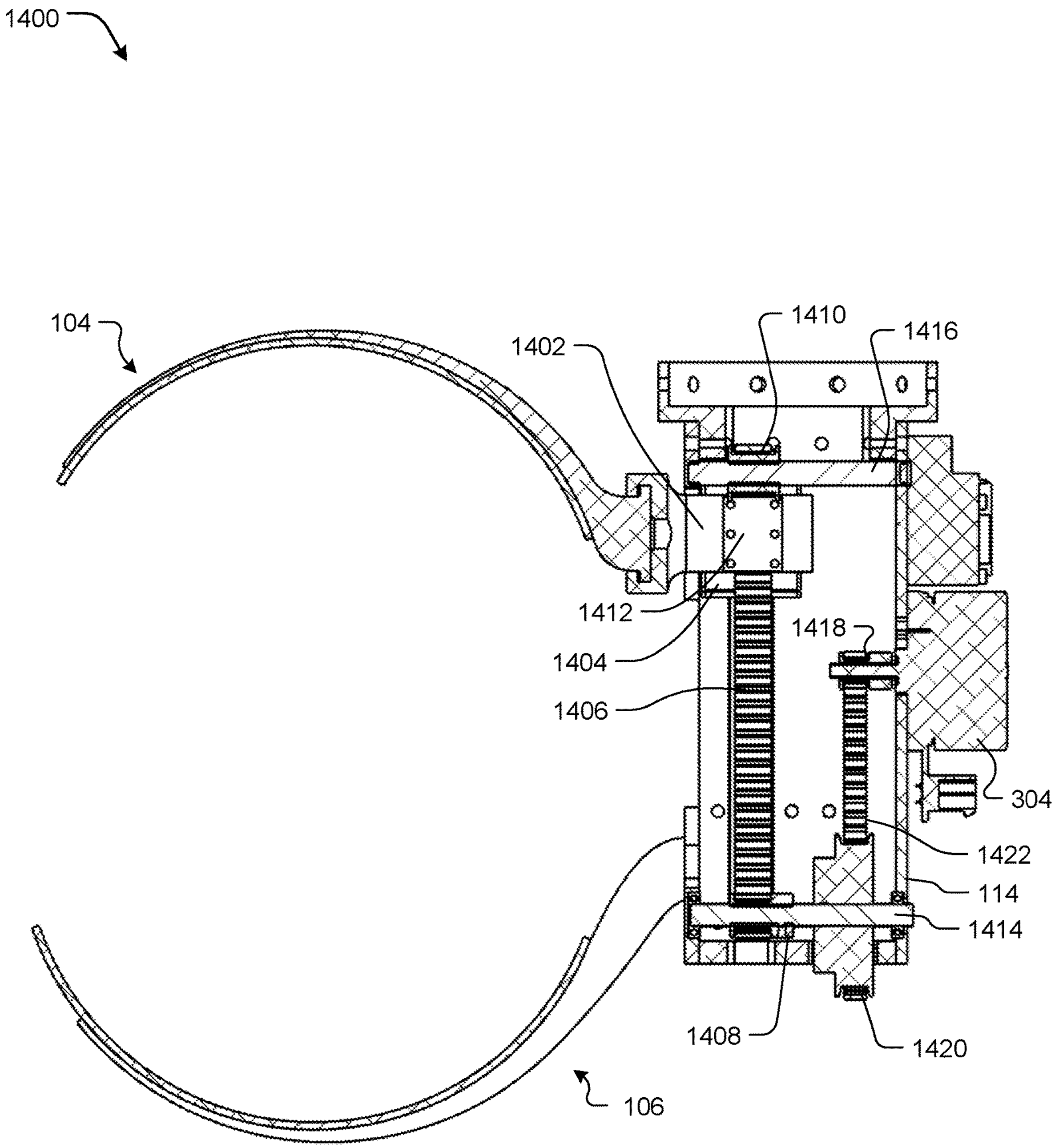
FIG. 14 illustrates an example cross-section view of a parallel gripper with alternative fingers of FIG. 13 in an open position according to some implementations.
Figure 15:
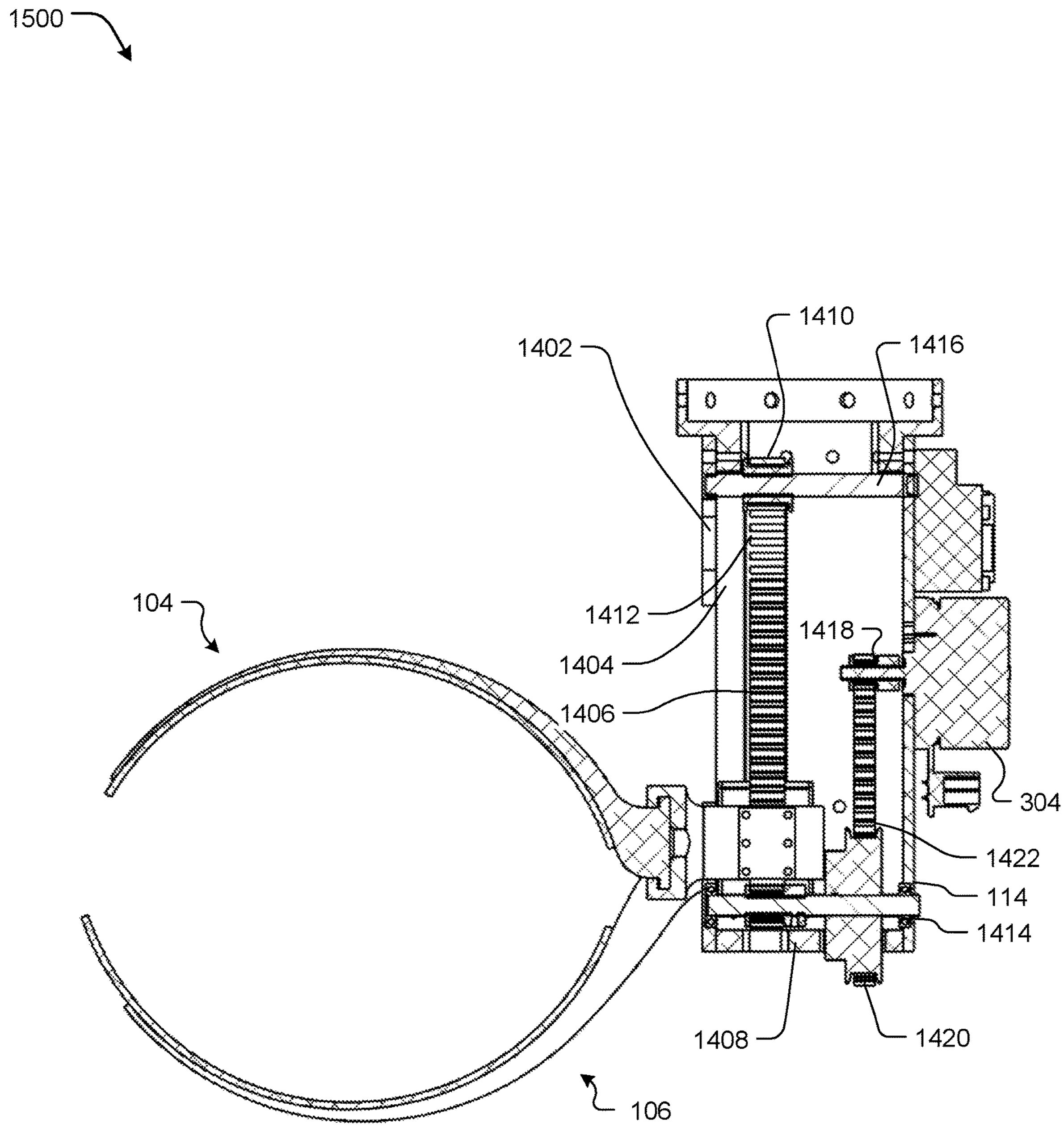
FIG. 15 illustrates an example cross-section view of a parallel gripper with alternative fingers of FIG. 13 in a close position according to some implementations.

FIG. 14 illustrates an example cross-section view 1400 of a parallel gripper 102 with alternative fingers of FIG. 13 in an open position according to some implementations and FIG. 15 illustrates an example cross-section view 1500 of a parallel gripper 102 with alternative fingers of FIG. 13 in a close position according to some implementations. In these examples, root portions 1402 of the upper jaw or finger 104 is fixed at a bearing carriage 1404. A first closed-loop timing belt 1406 tensioned by two pulleys, a driving pully 1408 and idler pulley 1410 runs parallel with a linear bearing. One side of the first closed-loop timing belt 1406 may be anchored to the carriage 1404 of the bearing by a clamping cap 1412. The driving pully 1408 and the idler pulley 1410 may be coupled to the body structure 114 via shafts 1414 and 1416 and bearings so that the driving pully 1408 and the idler pulley 1410 may rotate freely with respect to the body structure 114. A pinion pulley 1418 attached to the output shaft of the motor 304 is coupled to a spur pulley 1420 via a second closed-loop timing belt 1422. A number of teeth of the spur pully 1422 may be larger than that of the pinion pulley 1418 to amplify a motive force from the motor 304, and the ratio of the number of teeth may ranges from 1:2 to 1:10.

To reduce the overall size of the transmission, the number of teeth of the pinion pulley 1418 may be reduced below a threshold. The threshold may be based at least in part on a curvature of the second timing belt. The spur pulley 1422 may be rigidly and concentrically coupled to the driving pulley 1408, such that the spur pulley 1422 and the driving pulley 1408 rotate together. A number of teeth of the driving pulley 1408 may be within or equal to a threshold number of that of the pinion pulley 1418 to optimize the grasping force. The arrangement and configuration of the pulleys 1408, 1410, 1418, and 1422 as well as the timing belts 1406 and 1422 causes the rotational motive force of the motor 304 to drive. The rotating belt 1406 causes the carriages 1412 at one side of the belt 1406 to transition linearly to close or open the upper jaw or finger 104.

Figure 16:
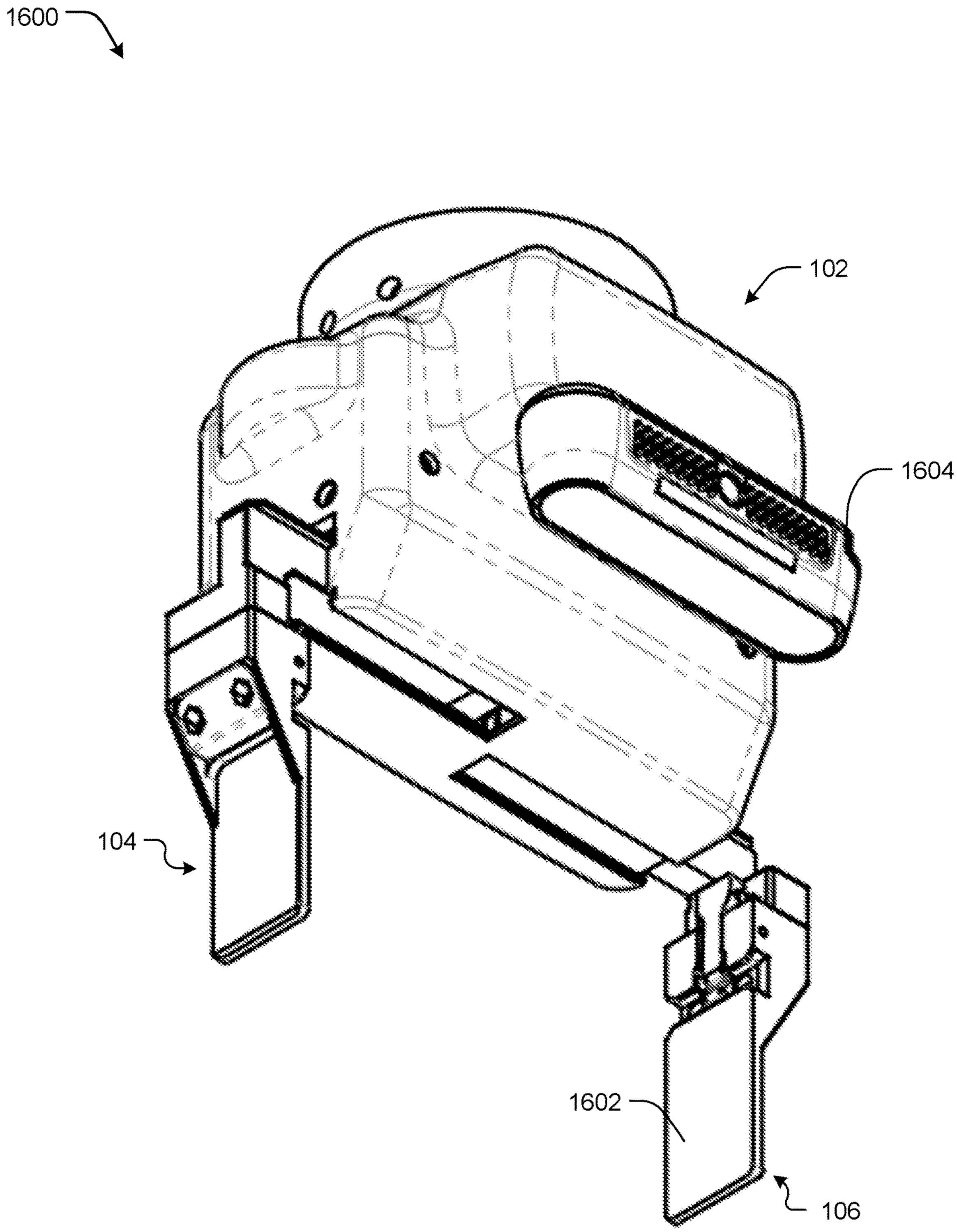
FIG. 16 illustrates an example parallel gripper with alternative fingers according to some implementations.

FIG. 16 illustrates an example 1600 of a parallel gripper 102 with alternative fingers 104 and 106 according to some implementations. In the current example, the parallel gripper 102 may utilize the same long-stroke and force-control system, described above with respect to FIGS. 1-15. However, as the fingers 104 and 106 of the current example may be removable and/or exchangeable by the robotic system. In this example, the fingers 104 and 106 include two opposing flat surfaces, such as surface 1602, for applying pressure and/or grasping objects.

The parallel gripper 102 also is shown equipped with a vision system 1604. It should be understood, that the parallel gripper 102 of FIGS. 1-15 may also be equipped with a vision system, such as system 1604, to provide machine controlled acquisition and control of the robotic arm and gripper 102. The vision system 1604 may be equipped with one or more sensors, such as one or more red-green-blue image devices, infrared image devices, monochrome image devices, motion sensors, spectral sensors, a combination thereof, and the like. The vision system 1604 may also be equipped with one or more emitters, illuminators, projectors or the like. For instance, the emitters may output markers or patterns that may be detected within sensor data generated by the sensors and thereby usable by the system to detect objects, classify the detected objects, determine respective positions between the object and the robotic gripper 102, and thereby grasp and move the object. In some cases, the system may utilize one or more machine learned models with respect to the sensor data to perform classification and segmentation on the sensor data. For example, the gripper 102 may utilize one or more neural networks that may generate any number of learned inferences or heads. In some cases, the neural network may be a trained network architecture that is end-to-end. In one example, the machine learned models may include segmenting and/or classifying extracted deep convolutional features of the sensor data into semantic data (e.g., object class, type, position, rigidity, and the like). In some cases, appropriate truth outputs of the model in the form of semantic per-pixel classifications (e.g., individual objects for picking within a basket or box etc.).

Figure 17:
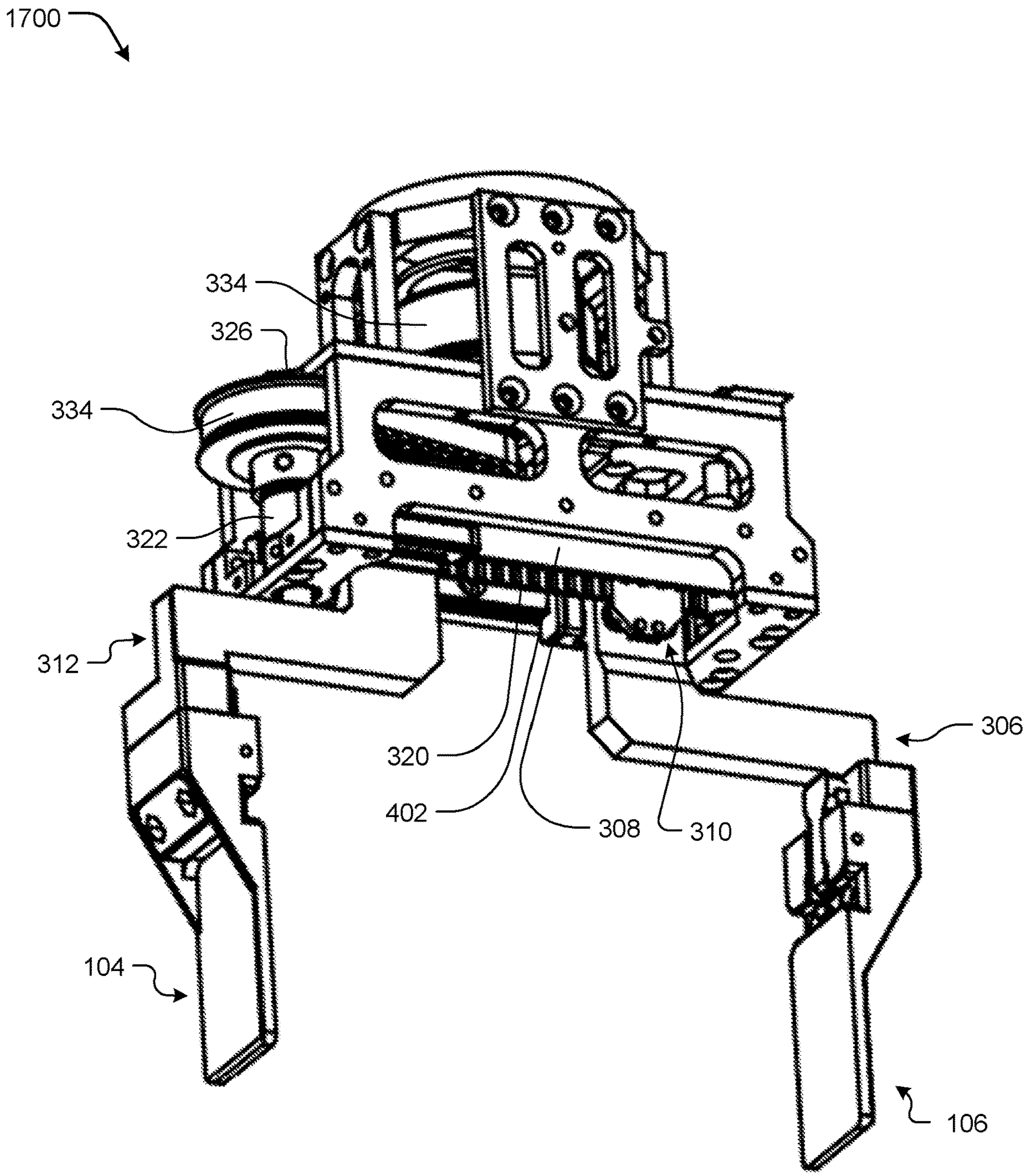
FIG. 17 illustrates an example view of a parallel gripper with fingers in the open position and the cover removed according to some implementations.

FIG. 17 illustrates an example view 1700 of a parallel gripper 102 of FIG. 16 with fingers 104 and 106 in the open position and the cover removed according to some implementations. The long stroke and force-controlled fingers 104 and 106 operate as discussed above with respect to FIGS. 3-10. As illustrated, the gripper 102 of FIG. 16 incudes the finger 106 coupled to a finger mounting structure 306 and the finger mounting structure 306 is coupled to a bearing carriage via root portions of the finger mounting structure 306 as discussed above. Likewise, the finger 106 is coupled to a finger mounting structure 312. The finger mounting structure 312 is coupled to a bearing carriage via root portions of the finger mounting structure 312. In the current example, the bearing carriages are arranged in parallel along linear bearings associated with a first closed-loop timing belt 320. The first closed-loop timing belt 320 may be tensioned between a drive pully and an idler pully. The drive pully and an idler pully may be physically coupled or connected to the body structure and bearings, as discussed above. In some cases, each side of the first closed-loop timing belt 320 may be anchored to the bearing carriage by a clamping cap. In some implementations, a pinion pulley may be coupled to an output shaft of the stationary portion of the motor. The pinion pulley may also be coupled to a spur pulley via a second closed-loop timing belt 334.

Figure 18:
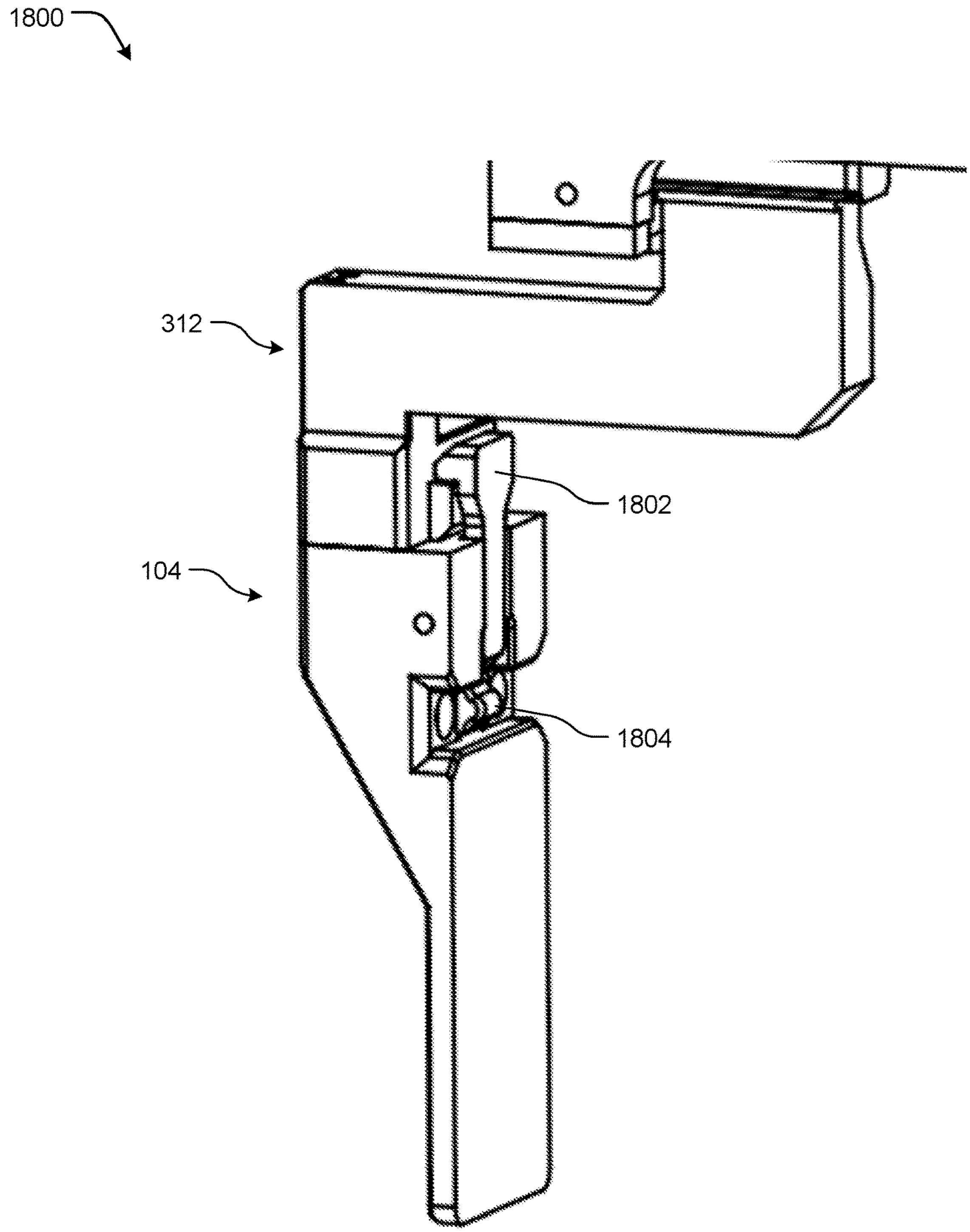
FIG. 18 illustrates an example pictorial view of a removable finger of a parallel gripper engaged with a finger mounting structure according to some implementations.

FIG. 18 illustrates an example pictorial view of a removable finger 104 of a parallel gripper 102 engaged with a finger mounting structure 312 according to some implementations. In the current example, the finger 104 is releasably coupled to the finger mounting structure 312. In this example, a spring loaded latch 1802 associated with the finger 104 is engaged with the finger mounting structure 312. The finger 104 also includes a release mechanism 1804, which, when engaged, causes the spring loaded latch 1804 to release or dis-engage from the finger mounting structure 312.

Figure 19:
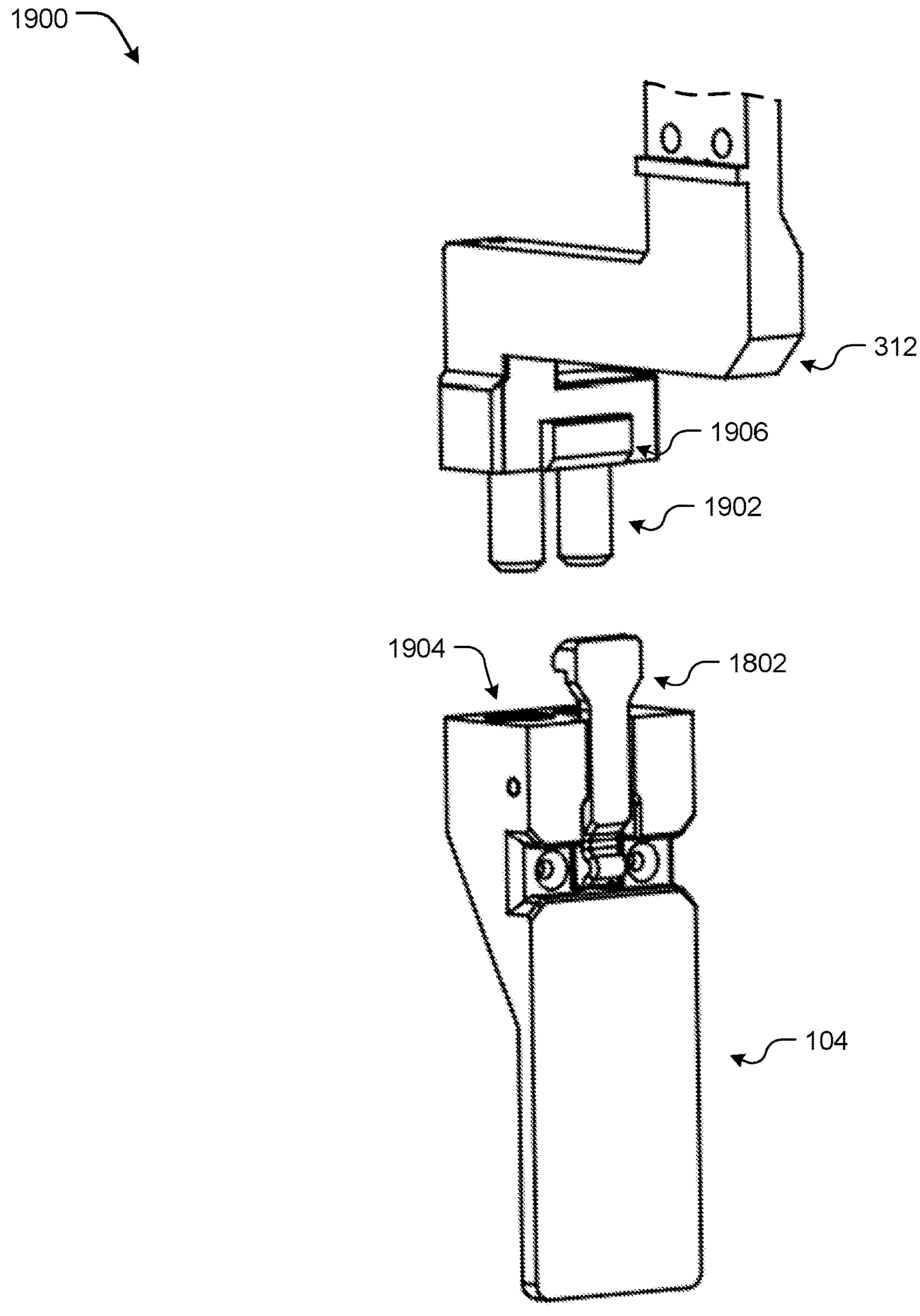
FIG. 19 illustrates an example pictorial view of a removable finger of a parallel gripper disengaged from a finger mounting structure according to some implementations.
Figure 20:
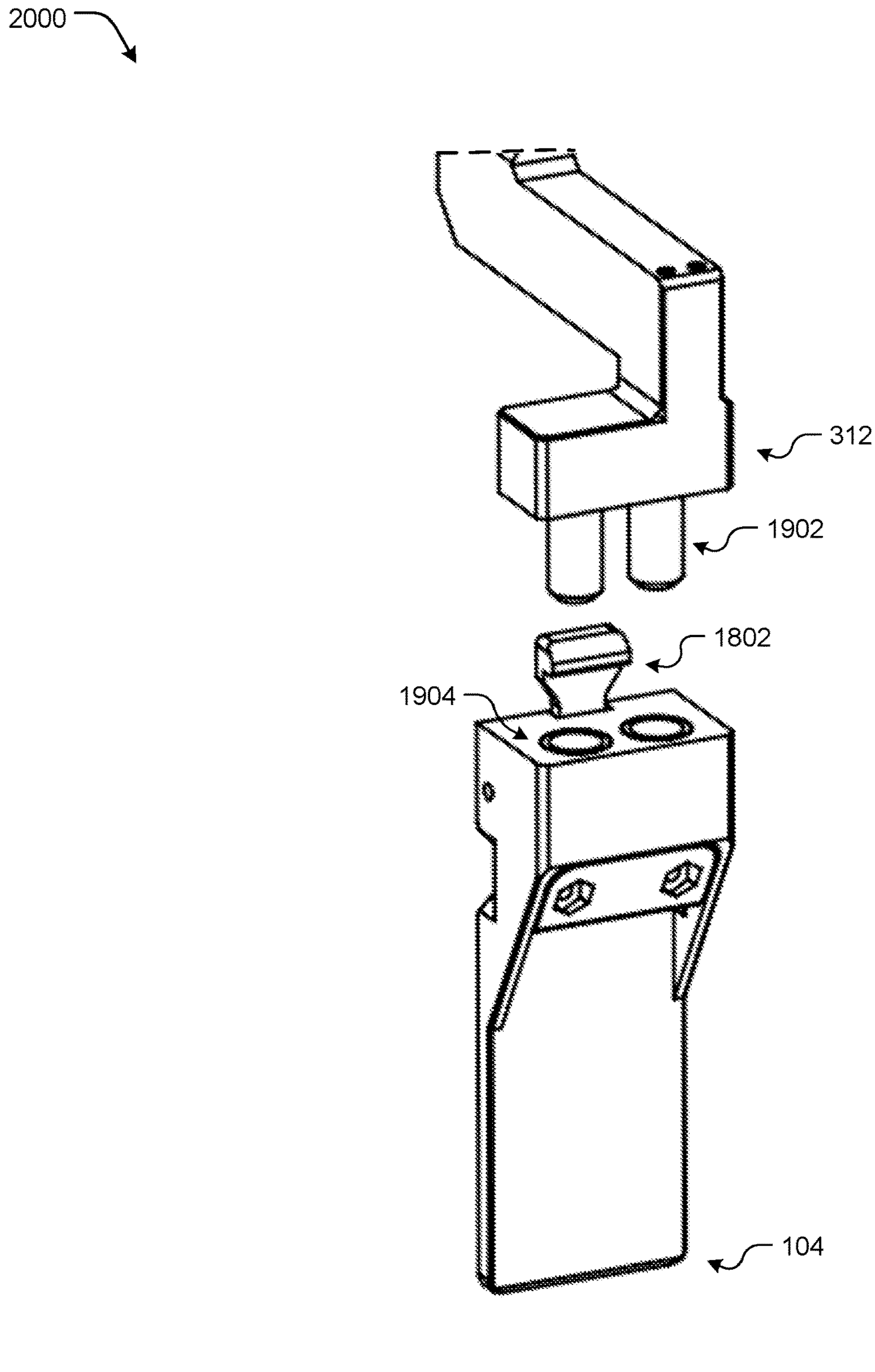
FIG. 20 illustrates another example pictorial view of a removable finger of a parallel gripper disengaged from a finger mounting structure according to some implementations.

FIGS. 19 and 20 illustrates example pictorial views 1900 and 2000 of a removable finger 104 of a parallel gripper 102 disengaged from a finger mounting structure 312 according to some implementations. In the current example, the finger mounting structure 312 includes one or more guides 1902 that may engage with corresponding receiving components 1904 associated with the finger 104. In some cases, the guides 1902 may assist with proper alignment of the finger mounting structure 312 and the finger 104 when the robotic system is coupling to the fingers 104 and 106, as well as to provide support and structural integrity between the finger mounting structure 312 and the finger 104 during operation.

The finger mounting structure 312 may also include a latching mechanism 1906 that is configured to mate with or engage the spring loaded latch 1802 of the finger 104 when coupled.

Figure 21:
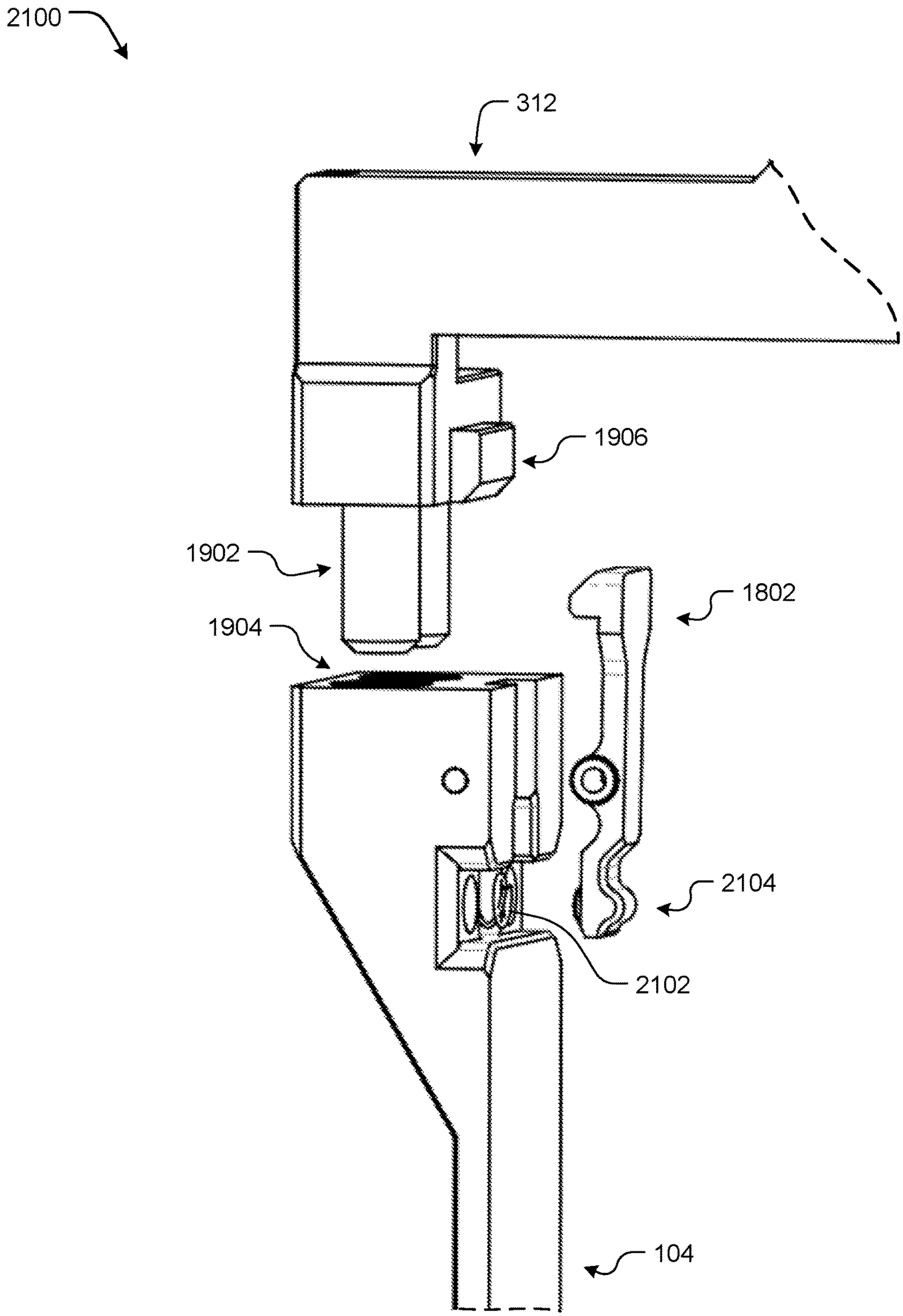
FIG. 21 illustrates an example exploded view of a removable finger of a parallel gripper disengaged from a finger mounting structure according to some implementations.

FIG. 21 illustrates an example exploded view 2100 of a removable finger 104 of a parallel gripper 102 disengaged from a finger mounting structure 312 according to some implementations. In this example, a spring 2102 is shown. The spring 2102 maintains the spring loaded latch 1802 engaged with the latch mechanism 1906 when there is no depression on the mechanical release trigger 2104. The pivoting point 2104 and the spring 2102 push the mechanical release trigger 2104 outward so that the spring loaded latch 1802 engages with 1906 in a manner of a lever. The depression on the mechanical release trigger 2104 itself causes the lift of the spring loaded latch 1802 out of the 1906 in opposition to the force of the spring 2104 allowing the finger mounting structure 312 and the gripper 102 to be lifted or vertically removed from the finger 104.

Figure 22:
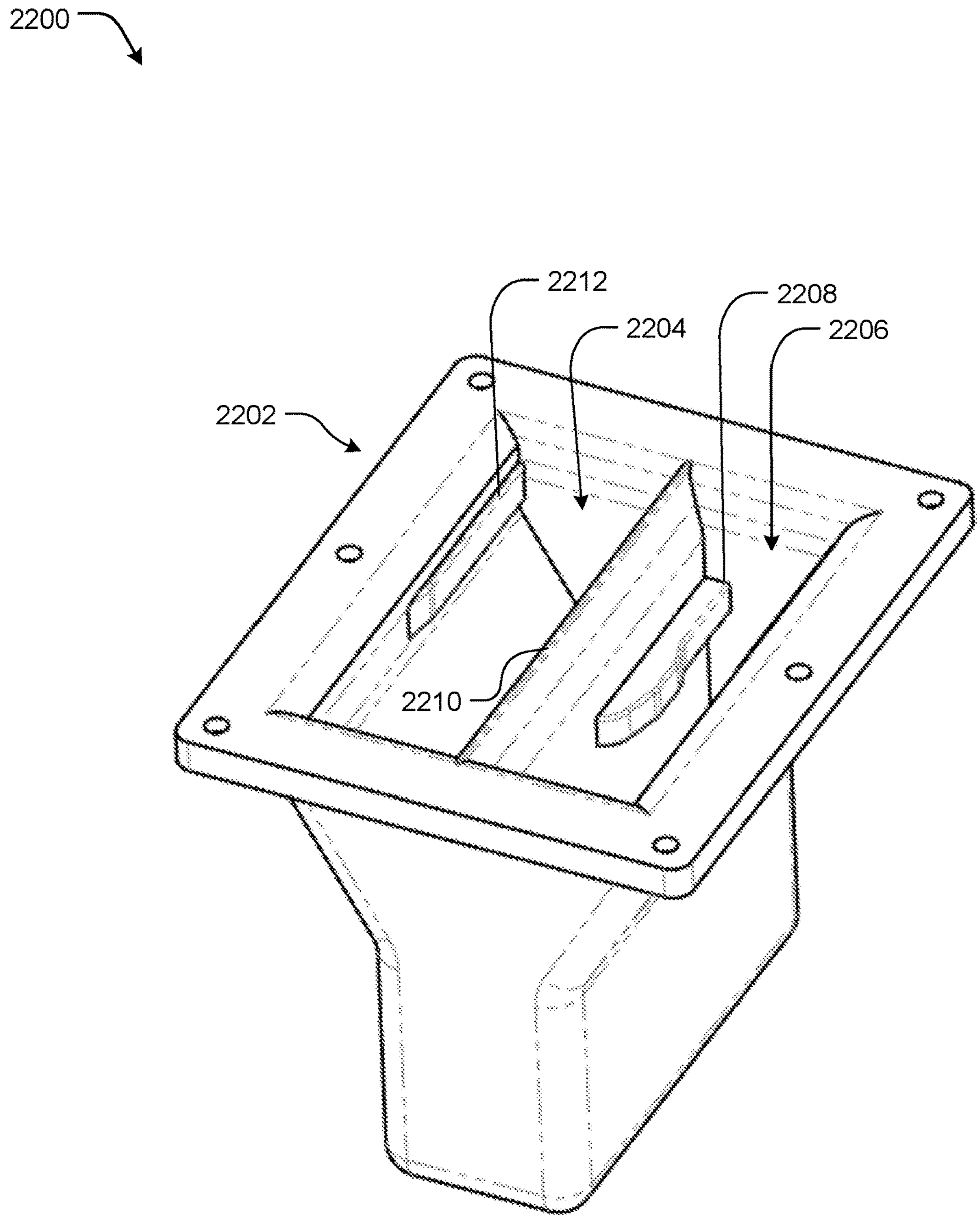
FIG. 22 illustrates an example pictorial view of a finger housing associated with the removable fingers of a parallel gripper according to some implementations.
Figure 23:
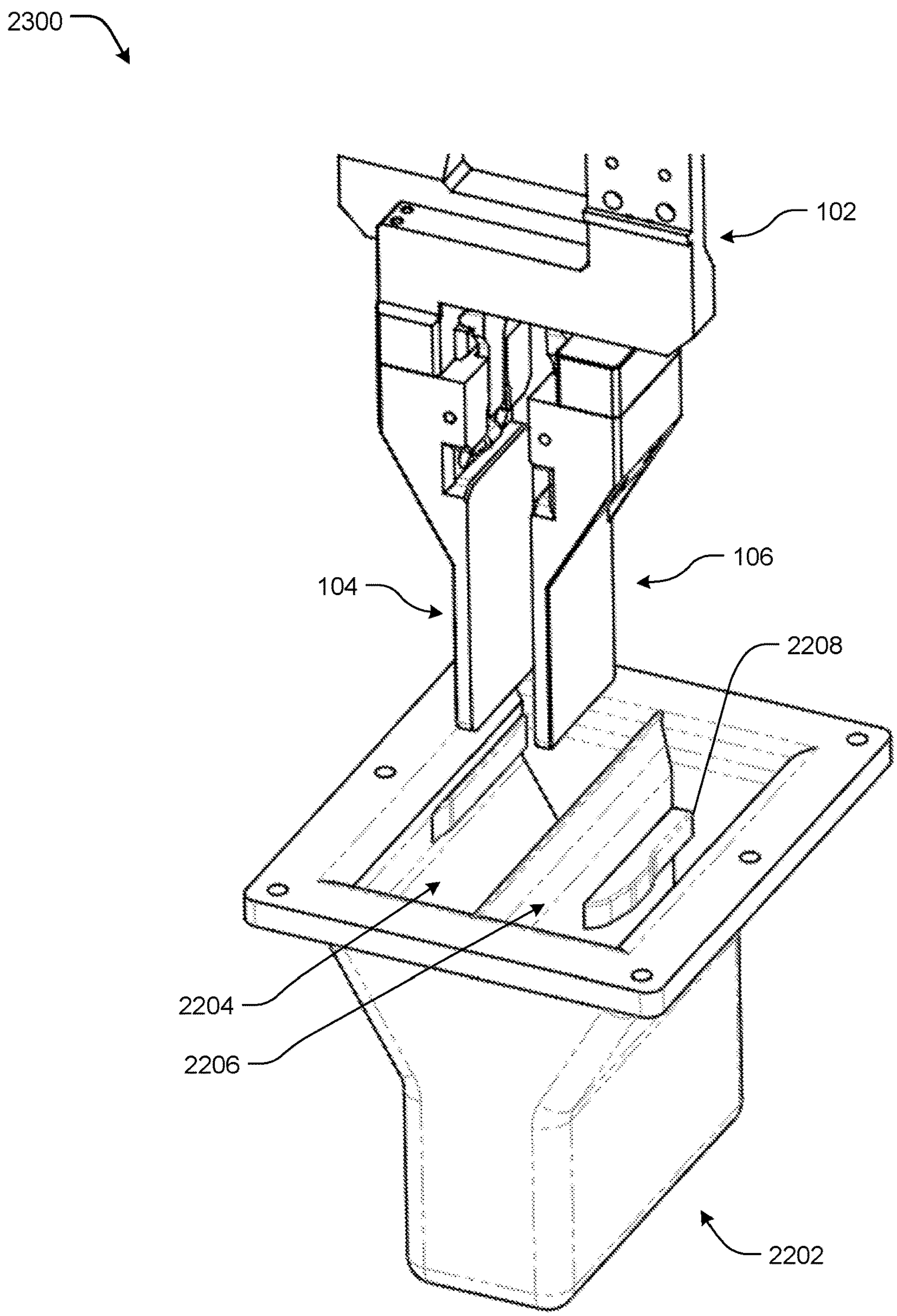
FIG. 23 illustrates an example pictorial view of a parallel gripper inserting fingers into a finger housing for removal according to some implementations.
Figure 24:
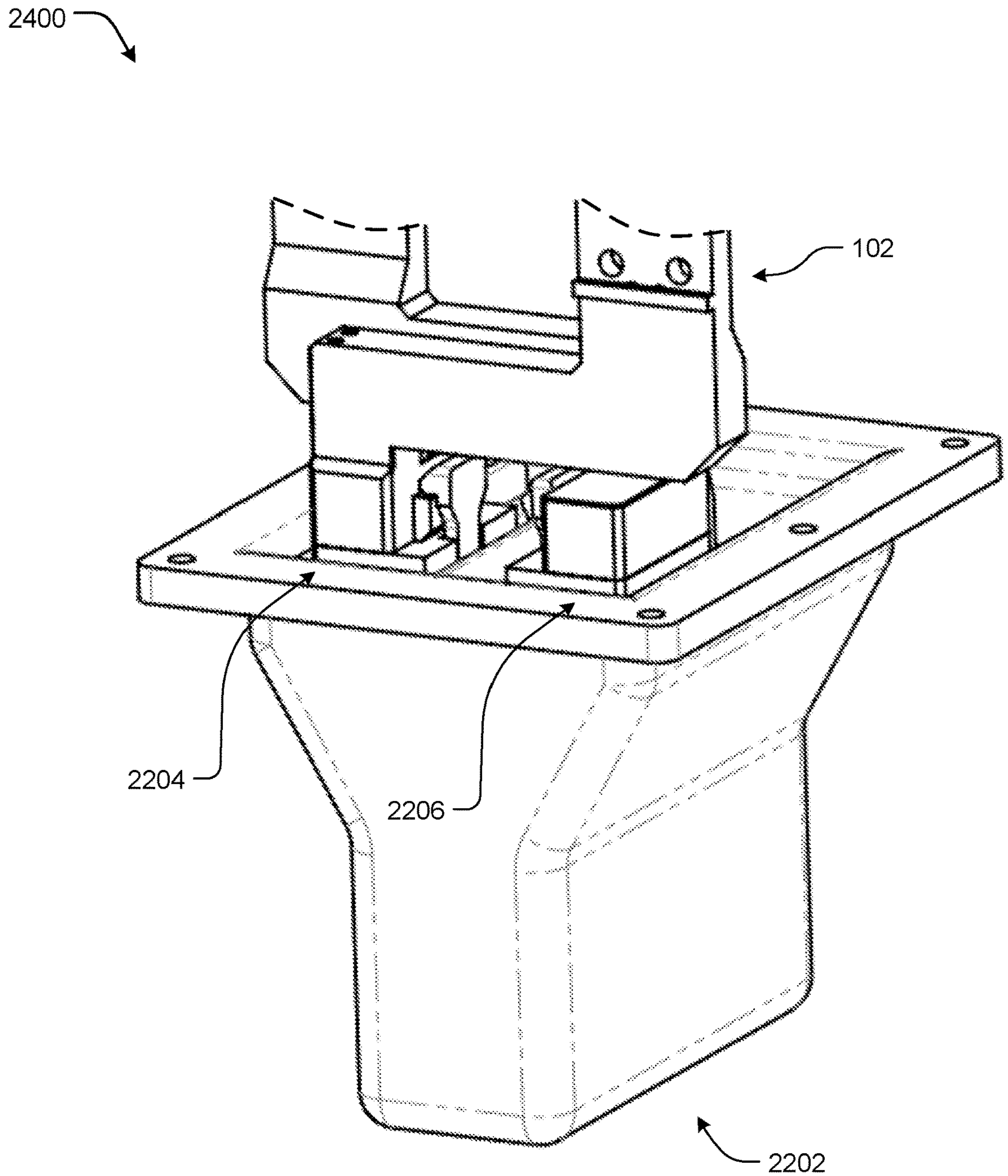
FIG. 24 illustrates an example pictorial view of a parallel gripper having inserted fingers into the finger housing for removal according to some implementations.

FIG. 22 illustrates an example pictorial view 2200 of a finger housing 2202 associated with the removable fingers of a parallel gripper according to some implementations. In the current example, the finger housing 2202 may include two receptacles 2204 and 2206 for receiving and engaging/disengaging both a right and left finger of a parallel gripper. The finger housing 2202 may also include a latch release mechanism for each of the receptacles 2204 and 2206, such as latch release mechanism 2208 of the receptacle 2206. The latch release mechanism 2208 and the latch release mechanism of the receptacle 2204 may be positioned along an interior wall or surface 2210 of the finger housing 2202. The interior wall 2210 may divide the receptacle 2204 from the receptacle 2206 and the latch release mechanisms may be positioned such that as the robotic system moves the fingers horizontally within the receptacles 2204 and 2206, the latch release mechanisms engage/disengage the mechanical release trigger of the corresponding fingers.

In the current example, the finger housing 2202 may also include a guide or assist mechanism, such as the assist mechanism 2212 of the receptacle 2204. The assist mechanism 2212 and the assist mechanism of the receptacle 2206 may be positioned on the outer wall of the receptacles opposite the latch release mechanisms to assist with aligning the mechanical release trigger of the corresponding fingers with the latch release mechanisms of the finger housing 2202.

FIGS. 23-26 illustrates example pictorial views of a parallel gripper 102 inserting fingers 104 and 106 into a finger housing 2202 for removal according to some implementations. With regards to FIG. 23, the robotic system aligns the fingers 104 and 106 with a first portion of the receptacles 2204 and 2206 and inserts the fingers 104 and 106, as illustrated with respect to FIG. 24. The first portion may be unobstructed by the latch release mechanisms, such as latch release mechanism 2208, positioned along the interior wall 2210 of the housing 2202.

Figure 25:
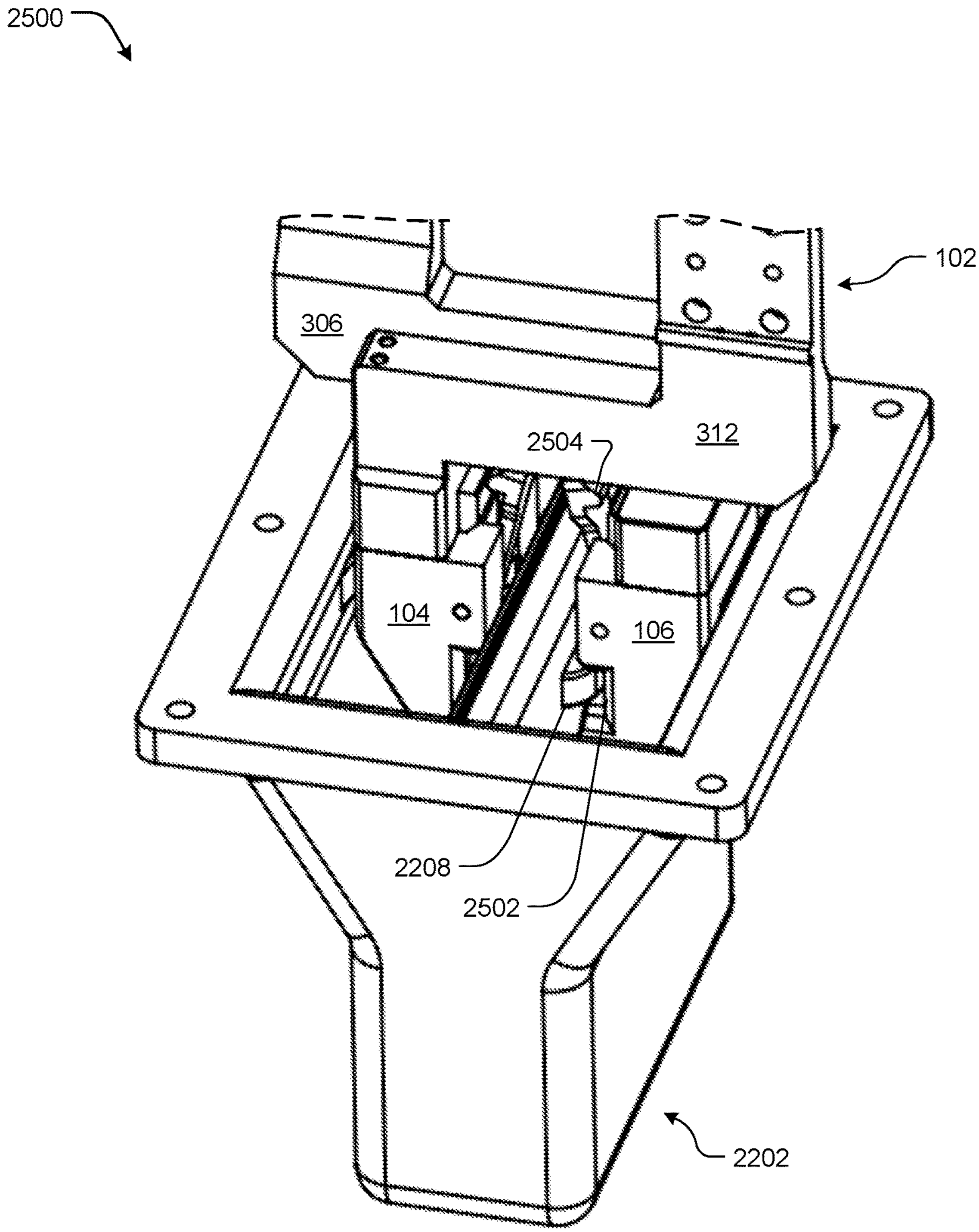
FIG. 25 illustrates an example pictorial view of a parallel gripper engaging the latch release mechanism of the finger housing for removal according to some implementations.
Figure 26:
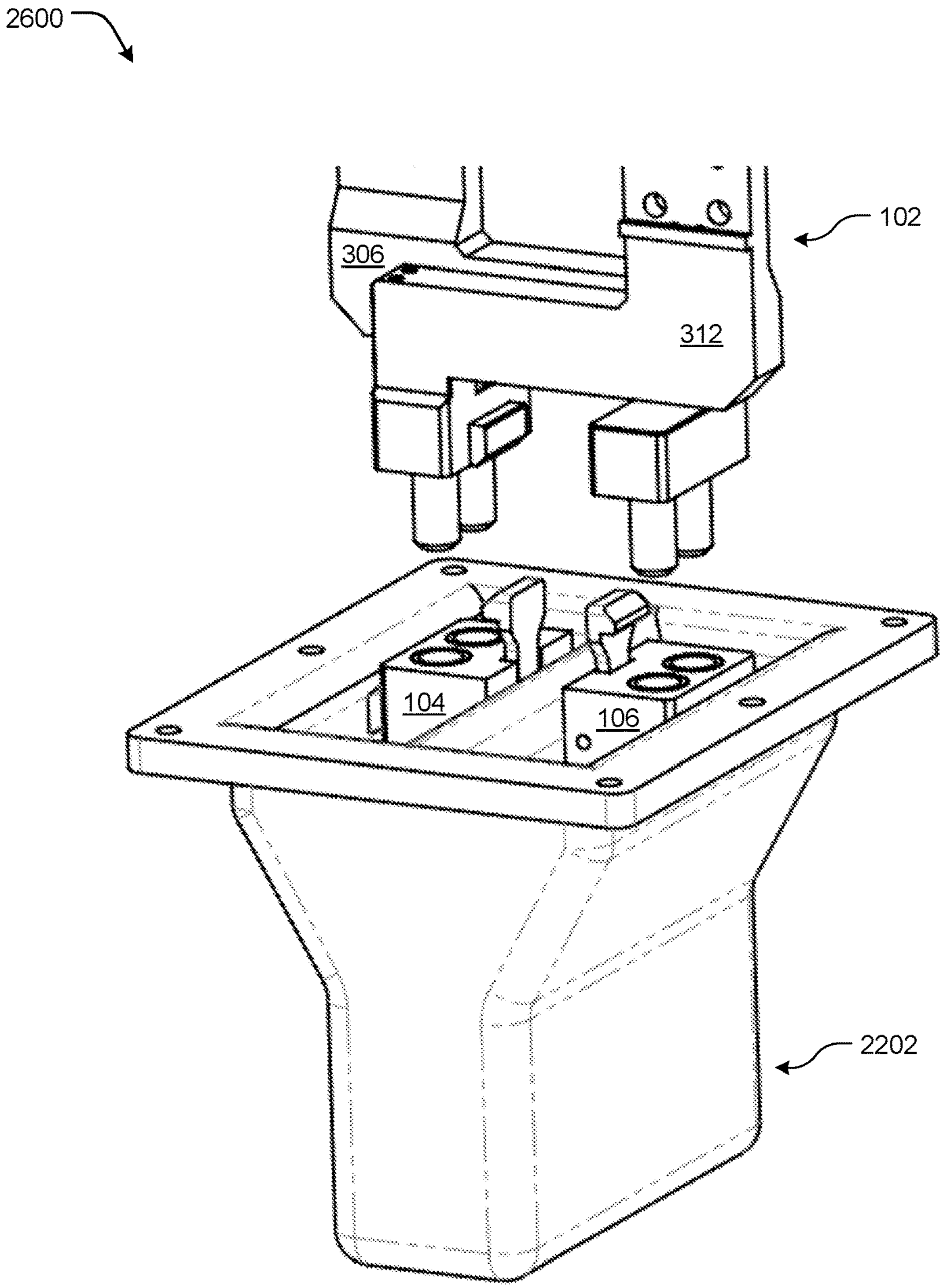
FIG. 26 illustrates an example pictorial view of a parallel gripper disengaging form the fingers inserted into the finger housing according to some implementations.
Figure 27:
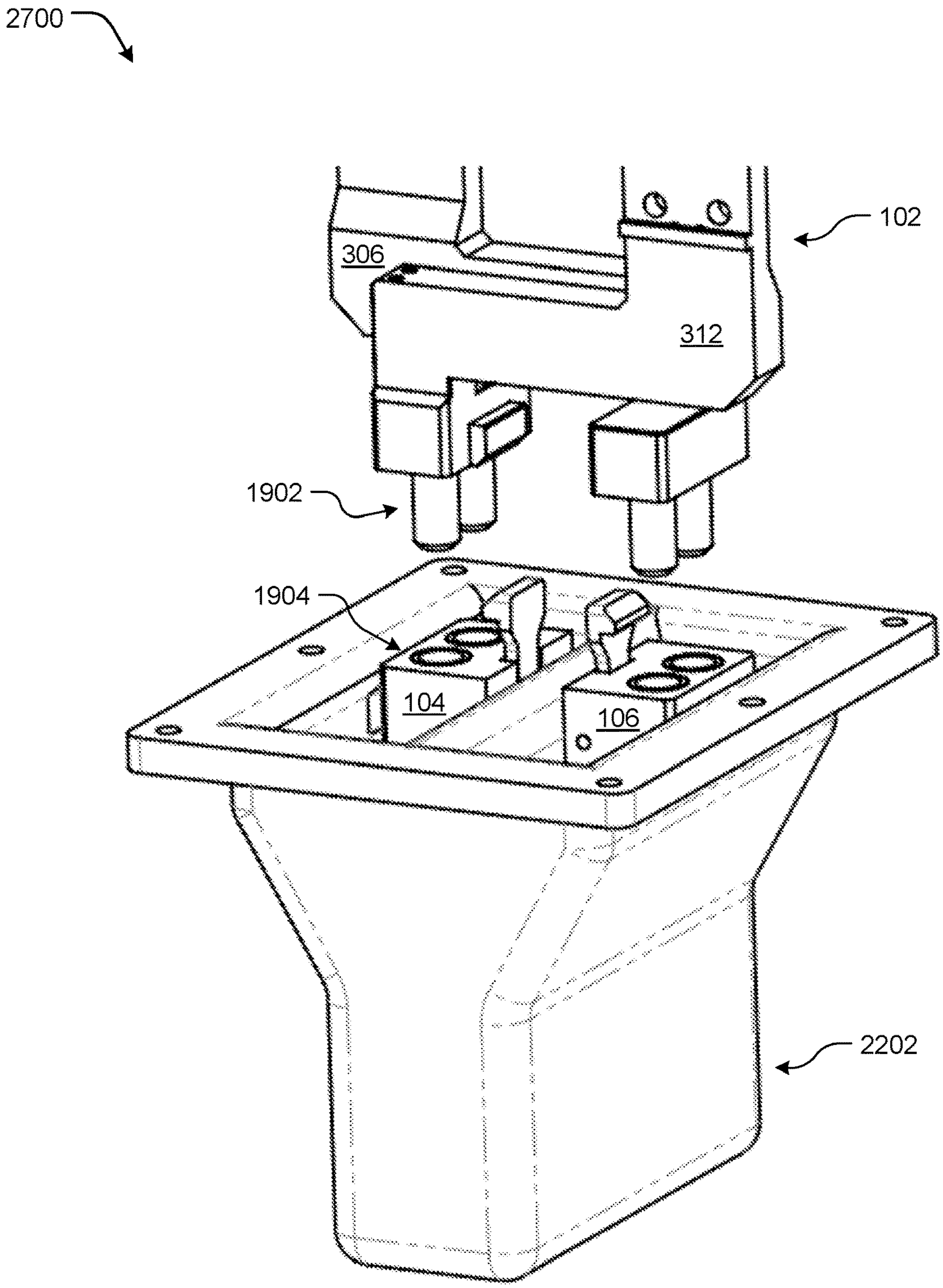
FIG. 27 illustrates an example pictorial view of a parallel gripper aligning with fingers stored in a finger housing according to some implementations.
Figure 28:
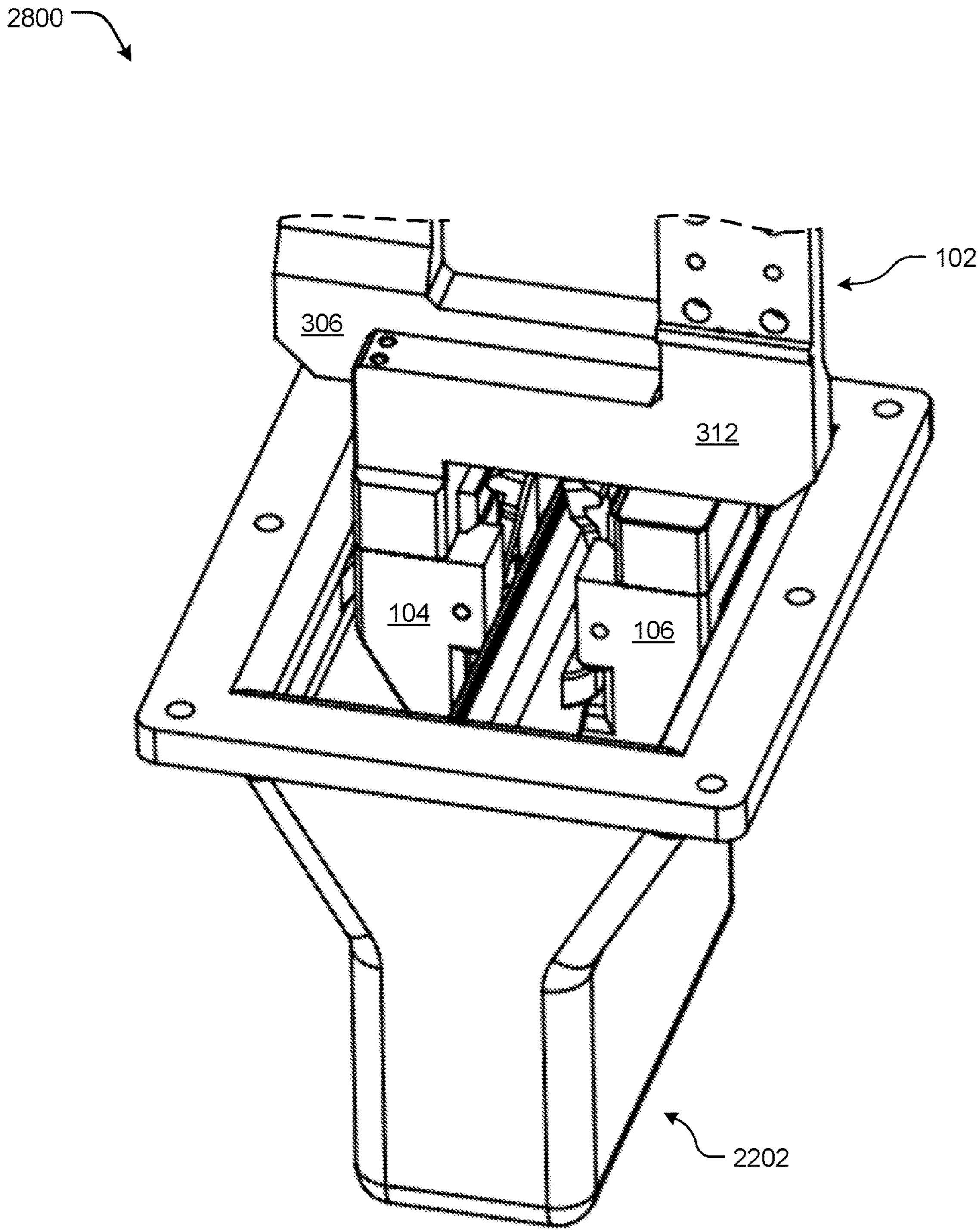
FIG. 28 illustrates an example pictorial view of a parallel gripper coupling to the fingers according to some implementations.
Figure 29:
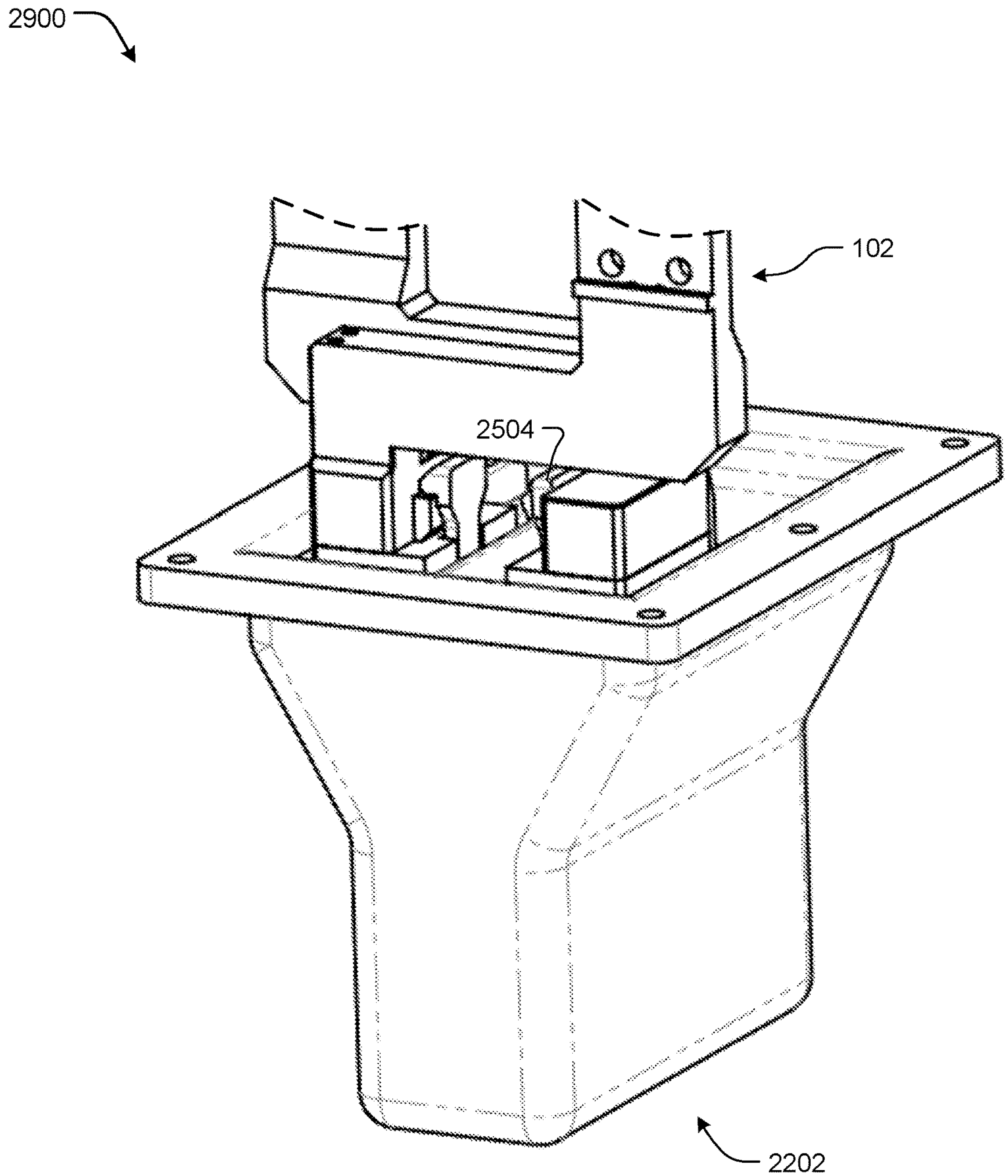
FIG. 29 illustrates an example pictorial view of a parallel gripper engaging a spring load latch of the fingers according to some implementations.
Figure 30:
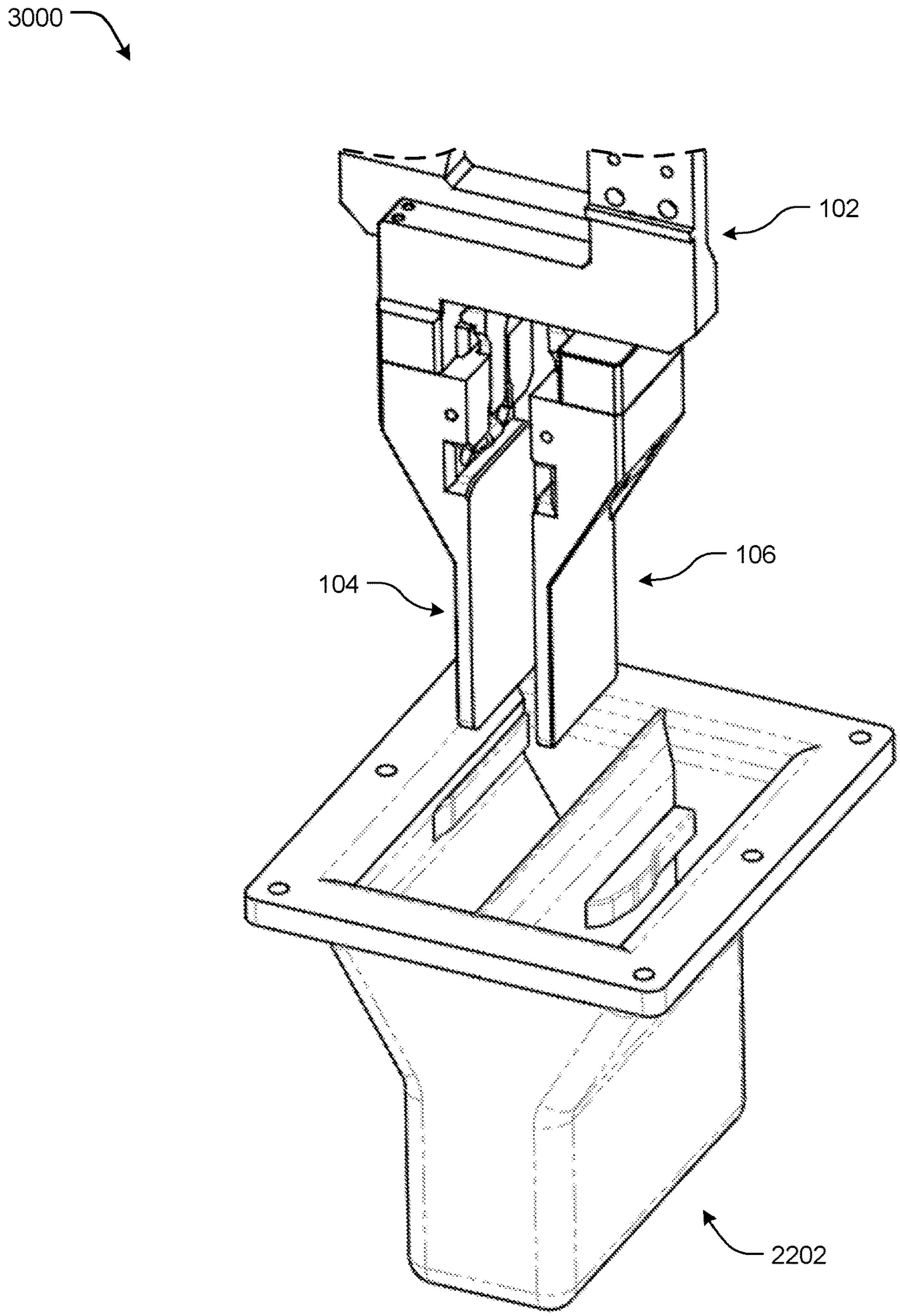
FIG. 30 illustrates an example pictorial view of a parallel gripper removing the fingers from the finger housing according to some implementations.

The robotic system may then move the gripper 102 and the fingers 104 and 106 horizontally within the housing 2202 to engage the latch release mechanism with the latch release trigger of each finger and cause the spring loaded latch to disengage or decouple from the finger support mechanisms, as illustrated with respect to FIG. 25. For example, the fingers 106 may be moved horizontally within the housing 2202 to engage the latch release mechanism 2208 with the latch release trigger 2402 and cause the spring loaded latch 2504 to disengage or decouple from the finger support mechanisms 306. The robotic system may then move the gripper 102 vertically or upward from the housing 2202 causing the finger support mechanisms 306 and 312 to disengage from the fingers 104 and 106, as illustrated with respect to FIG. 26.

FIGS. 27-30 illustrates an example pictorial views of a parallel gripper 102 engaging fingers 104 and 106 according to some implementations. With regards to FIG. 27, the robotic system may align one or more of the guides 1902 of the finger support mechanism 312 and/or 306 with corresponding receiving components 1904 of the fingers 104 and 106 within the housing 2202. The robotic system may then engage the guides 1902 with the receiving components 1904, as illustrated with respect to FIG. 28, by moving the gripper 102 downward in a vertical manner. The robotic system may then move the gripper 102 as well as the engaged fingers 104 and 106 horizontally, as illustrated with respect to FIG. 29. The horizontal motion causes the spring loaded latches, such as latch 2504, of the fingers 104 and 106 to engage with the corresponding finger support mechanism 312 and/or 306, thereby securing the fingers 104 and 106 to the gripper 102. The robotic system may then remove the fingers 104 and 106 from the housing 2202 by moving the gripper 102 in an upward direction, as illustrated with respect to FIG. 30.

Figure 31:
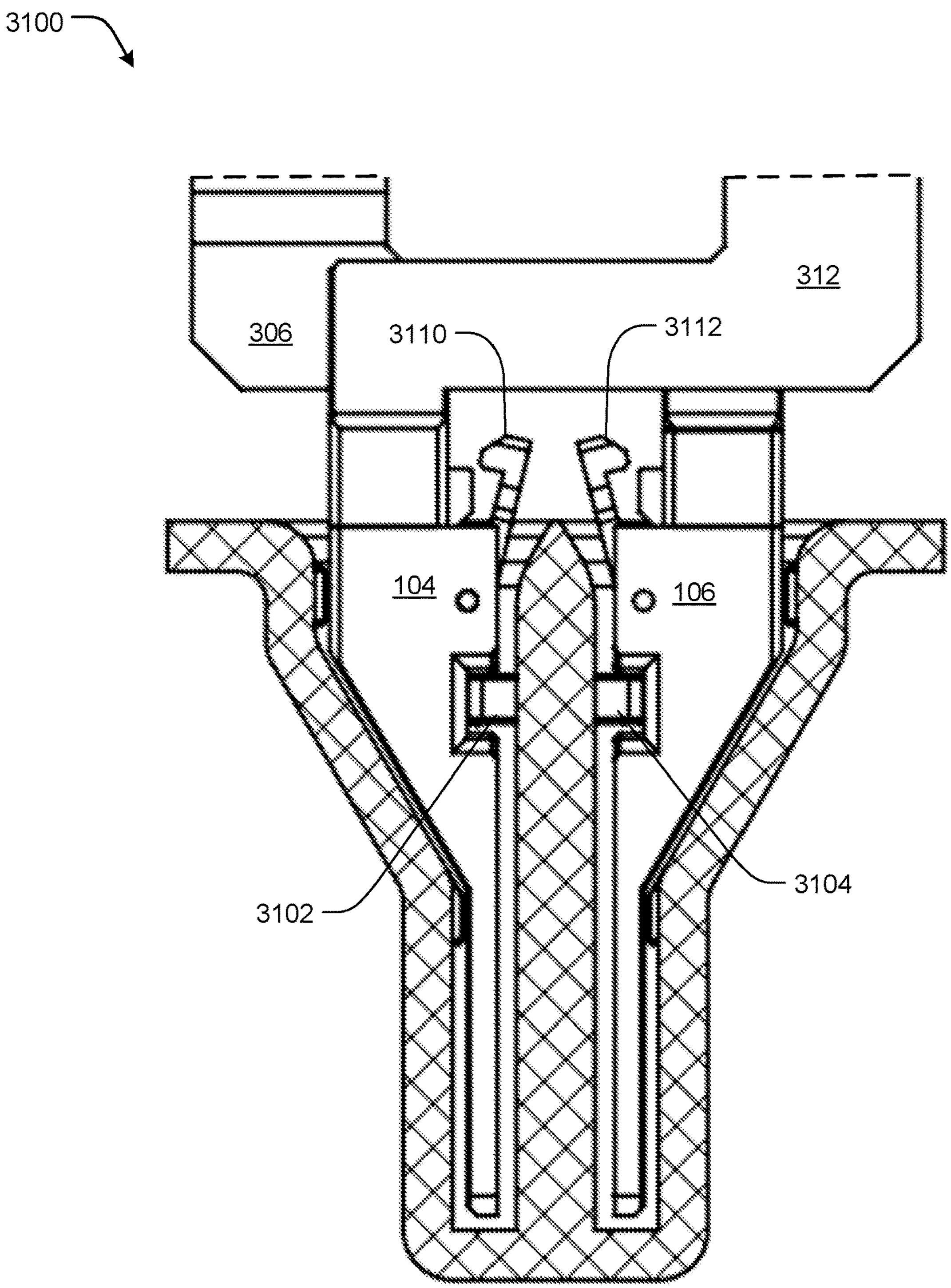
FIG. 31 illustrates an example cross sectional view of the parallel gripper of FIG. 17 with fingers inserted into the finger housing of FIG. 22 according to some implementations.

FIG. 31 illustrates an example cross sectional view 3100 of the parallel gripper 102 of FIG. 17 with fingers inserted into the finger housing 2202 of FIG. 22 according to some implementations. In the current example, the fingers 104 and 106 are positioned to engage the latch release mechanisms 3102 and 3104 causing spring loaded latches 3106 and 3108 to release or unlock from the latching mechanisms 3110 and 3112 of the finger support mechanisms 312 and 306, as shown. The robotic system may disengage from the fingers 104 and 106 by pulling the gripper 102 upward or engage with the fingers 104 and 106 by moving the gripper 102 in a horizontal direction, as discussed above.

Figure 32:
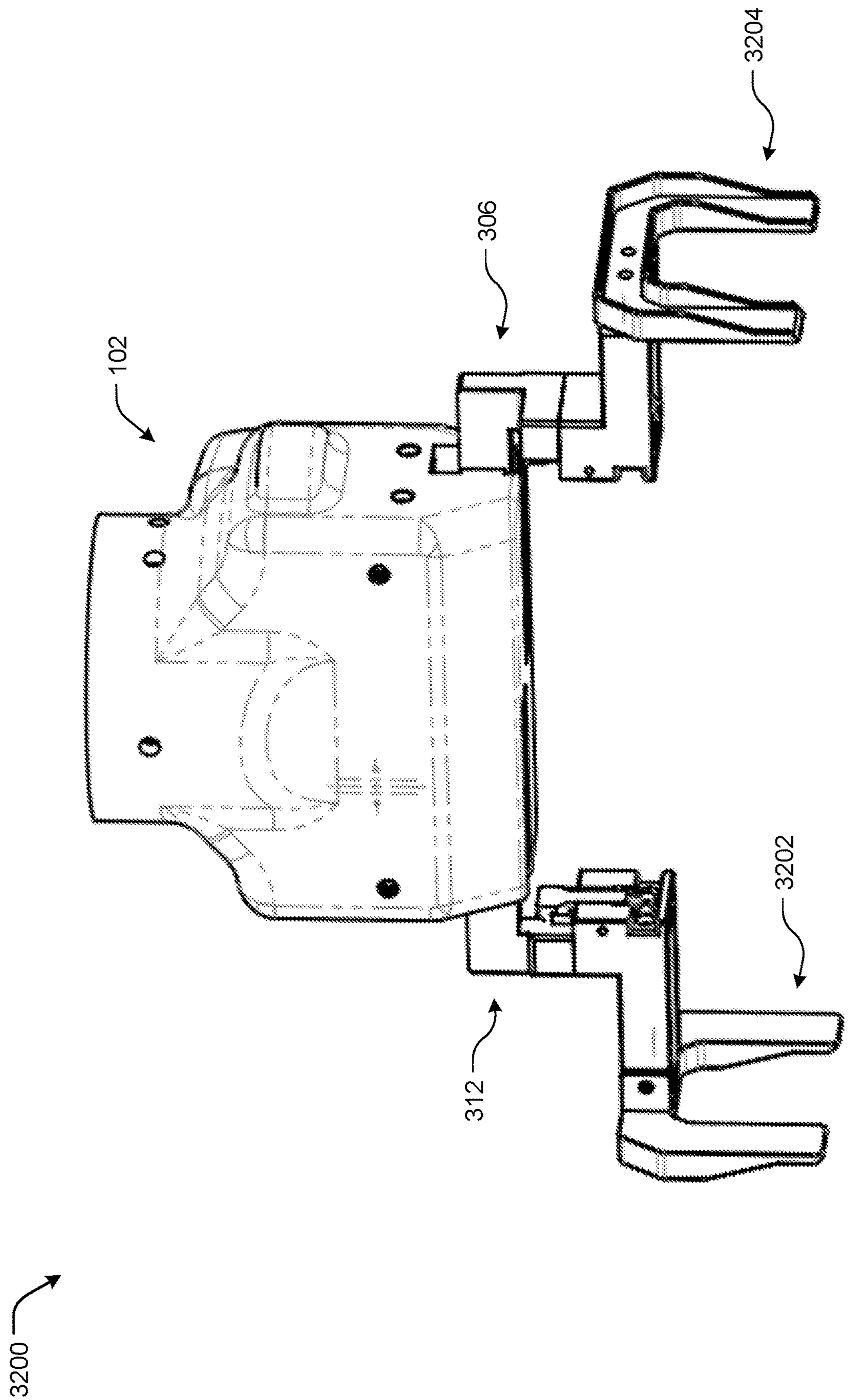
FIG. 32 illustrates another example pictorial view of a parallel gripper with alternative fingers according to some implementations.

FIG. 32 illustrates another example pictorial view 3200 of a parallel gripper 102 with alternative fingers 3202 and 3204 according to some implementations. In this example, the fingers 3202 and 3204 may be coupled to the finger support mechanisms 306 and 312 as discussed above with respect to FIGS. 17-31. In this case the fingers 3202 and 3204 may be used to grasp larger objects than the fingers 104 and 102.

Figure 33:
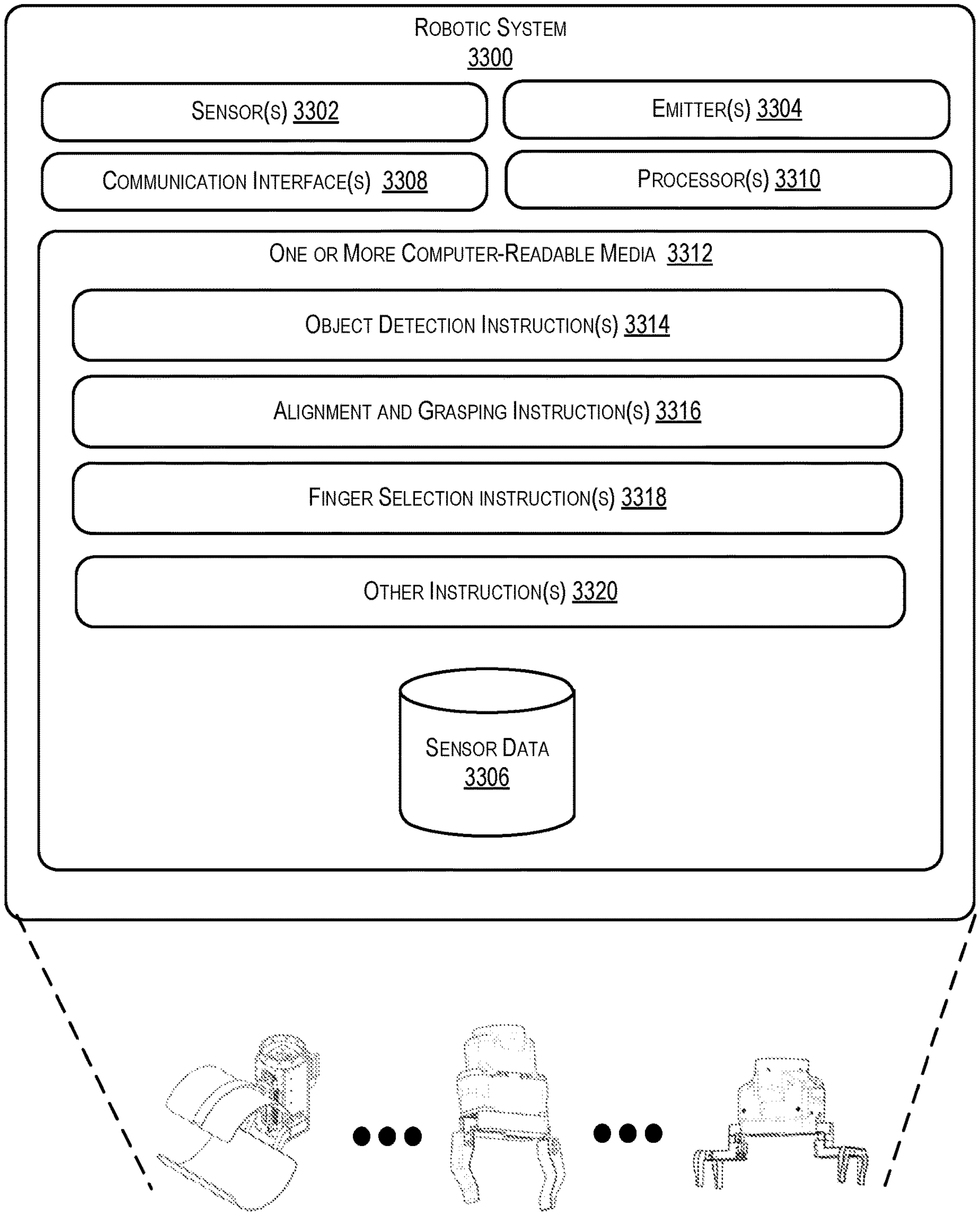
FIG. 33 is an example robotic system 3300 associated with the parallel gripper of FIGS. 1-32 according to some implementations.

FIG. 33 is an example robotic system 3300 associated with the parallel gripper 102 of FIGS. 1-32, in accordance with one or more examples. As discussed above, the system 3300 may be configured to provide a robotic gripper 102 with interchangeable long stroke and force controlled fingers. In some cases, the system 3300 may include sensors 3302 and/or emitters 3304 to generate image data or sensor data 3306 associated with an environment. The sensor data 3306 may be utilized to detect objects in the environment, such as an object to pick up or grasp, orientate the robotic system 3300 or gripper 102 with the object, and/or to exchange fingers, as discussed above.

The system 3300 may also include one or more communication interfaces 3308 configured to facilitate communication between one or more networks, one or more cloud-based system, and/or one or more electronic devices, such as operator's or monitor's system. The communication interfaces 3308 may also facilitate communication between one or more wireless access points, a master device, and/or one or more other computing devices as part of an ad-hoc or home network system. The communication interfaces 3308 may support both wired and wireless connection to various networks, such as cellular networks, radio, WiFi networks, short-range or near-field networks (e.g., Bluetooth®), infrared signals, local area networks, wide area networks, the Internet, and so forth.

The system 3300 may also include one or more processors 3310, such as at least one or more access components, control logic circuits, central processing units, or processors, as well as one or more computer-readable media 3312 to perform the function associated with the virtual environment (I'm not sure this previous statement is correct here? Virtual Environment seems like something from a different patent). Additionally, each of the processors 3310 may itself comprise one or more processors or processing cores.

Depending on the configuration, the computer-readable media 3312 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 3310.

Several modules such as instruction, data stores, and so forth may be stored within the computer-readable media 3312 and configured to execute on the processors 3310. For example, as illustrated, the computer-readable media 3312 may store object detection instructions 3314 to identify and detect objects in the environment, alignment and grasping instructions 3316 to cause the system 3300 to align and pick up an object and finger selection instructions 3318 to select, engage, and disengage various fingers with the gripper, as well as other instructions 3320, such as an operating system.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A robotic system comprising:
- a robotic arm;
- a gripper coupled to the robotic arm, the gripper comprising:
  - a first finger support structure comprising:
    - a first horizontal member, a first vertical member extending downward from a first end of the first horizontal member, and a second vertical member extending upward from a second end of the first horizontal member, the first end of the first horizontal member opposite the second end of the first horizontal member;
    - one or more first guides extending downward from the first vertical member;
    - a latching mechanism extending horizontally from the first vertical member; and
  - a first finger comprising:
    - one or more first receiving components, the one or more first receiving components to releasably couple to the one or more first guides of the first finger support structure; and
    - a first spring loaded latch, the first spring loaded latch to releasably couple to the first latching mechanism of the first finger support structure; and
- wherein the one or more guides of the first finger support structure are inserted into the one or more receiving components of the first finger and moved horizontally from the first portion of the receptacle to a second portion of the receptacle to disengage the latch release mechanism and couple the first finger to the first finger support structure.

2. The robotic system as recited in claim 1, wherein the gripper further comprises:
- a second finger support structure comprising:
  - a second horizontal member, a third vertical member extending downward from a first end of the second horizontal member, and a fourth vertical member extending upward from a second end of the second horizontal member, the first end of the second horizontal member opposite the second end of the second horizontal member;
  - one or more guides extending downward from the third vertical member;
  - a latching mechanism extending horizontally from the third vertical member; and
- a second finger comprising:
  - one or more second receiving components, the one or more second receiving components to releasably couple to the one or more second guides of the second finger support structure; and
  - a second spring loaded latch, the second spring loaded latch to releasably couple to the second latching mechanism of the second finger support structure.

3. The robotic system as recited in claim 2, wherein:
- the first finger support structure is coupled to a first carriage via the second vertical member; and
- the second finger support structure is coupled to a second carriage via the fourth vertical member; and
- the first carriage is coupled to a first side of a first closed-loop timing belt;
- the second carriage is coupled to a second side of the first closed-loop timing belt; and
- the first closed-loop timing belt is tensioned between a first parallelly placed linear bearing and a second linear bearing by a first pulley and a second pulley.

4. The robotic system as recited in claim 3, wherein the first pulley is a driving pulley and the second pulley is an idler pulley and the gripper further comprises:
- a pinion pulley coupled to a shaft of a motor;
- a spur pulley concentrically coupled to the driving pulley; and
- a second closed-loop timing belt tensioned by the pinion pulley and the spur pulley.

5. The robotic system as recited in claim 3, wherein the first pulley is coupled to a body structure of the gripper via a first shaft and the second pulley is coupled to the body structure via a second shaft, such that the first pulley and the second pulley may rotate freely with respect to the body structure.

6. The robotic system as recited in claim 1, further comprising a finger housing, the finger housing comprising:
- a first receptacle for receiving the first finger, the first receptacle defining a space, the first receptacle having a first interior surface and a second interior surface opposite the first interior surface;

a latch release mechanism extending outward into a first portion of the receptacle along the first interior surface; and an assist mechanism extending outward into the first portion of the receptacle along the second interior surface, the latch release mechanism of the first interior surface parallel to the assist mechanism of the second interior surface.

7. The robotic system as recited in claim 6, wherein the first finger is inserted into a second portion of the receptacle and moved horizontally from the second portion to the first portion of the receptacle to engage the latch release mechanism and disengage the first finger from the first finger support structure.

8. A parallel gripper comprising:

a first s-shaped finger support structure comprising:

one or more first guides extending downward from a first end of the s-shaped finger support structure;

a latching mechanism extending horizontally from the first end of the s-shaped finger support structure; and a first finger comprising:

one or more first receiving components, the one or more first receiving components to releasably couple to the one or more first guides of the first s-shaped finger support structure; and a first spring loaded latch extending outward from an exterior of the first finger and upwards passed a top surface of the first finger, the first spring loaded latch to releasably couple to the first latching mechanism of the first s-shaped finger support structure.

9. The parallel gripper of claim 8, further comprising:

a second s-shaped finger support structure comprising:

one or more guides extending downward from the first end of the second s-shaped finger support structure;

a latching mechanism extending horizontally from the first end of the second s-shaped finger support structure; and a second finger comprising:

one or more second receiving components, the one or more second receiving components to releasably couple to the one or more second guides of the second s-shaped finger support structure; and a second spring loaded latch, the second spring loaded latch to releasably couple to the second latching mechanism of the second s-shaped finger support structure.

10. The parallel gripper of claim 9, wherein the first s-shaped finger support structure is coupled, at a second end, to a first carriage; and the second s-shaped finger support structure is coupled, at a second end, to a second carriage; and the first carriage is coupled to a first side of a first closed-loop timing belt;

the second carriage is coupled to a second side of the first closed-loop timing belt; and the first closed-loop timing belt is tensioned between a first parallelly placed linear bearing and a second linear bearing by a first pulley and a second pulley.

11. The parallel gripper of claim 10, wherein the first pulley is a driving pulley and the second pulley is an idler pulley and the gripper further comprises:

a pinion pulley coupled to a shaft of a motor;

a spur pulley concentrically coupled to the driving pulley; and a second closed-loop timing belt tensioned by the pinion pulley and the spur pulley.

12. The parallel gripper of claim 8, further comprising a finger housing, the finger housing comprising:

a first receptacle for receiving the first finger, the first receptacle defining a space, the first receptacle having a first interior surface and a second interior surface opposite the first interior surface;

a latch release mechanism extending outward into a first portion of the receptacle along the first interior surface; and an assist mechanism extending outward into the first portion of the receptacle along the second interior surface, the latch release mechanism of the first interior surface parallel to the assist mechanism of the second interior surface.

13. The parallel gripper of claim 12, wherein parallel gripper further comprising one or more processors and one or more computer readable media storing instructions which, when executed by the one or more processors, cause the parallel gripper to perform operations including inserting the first finger into a second portion of the receptacle and moving the first finger horizontally from the second portion to the first portion of the receptacle to engage the latch release mechanism and disengage the first finger from the first s-shaped finger support structure.

14. The parallel gripper of claim 12, wherein parallel gripper further comprising one or more processors and one or more computer readable media storing instructions which, when executed by the one or more processors, cause the parallel gripper to perform operations including inserting the one or more guides of the first s-shaped finger support structure into the one or more receiving components of the first finger and moving the first finger horizontally from the first portion of the receptacle to a second portion of the receptacle to disengage the latch release mechanism and couple the first finger to the first s-shaped finger support structure.

15. A gripper for a robotic arm comprising:

a first finger support structure comprising:

a first guide extending downward from a first end of the finger support structure;

a second guide extending downward from a first end of the finger support structure;

a latching mechanism positioned above the first guide and the second guide extending horizontally outward from the first end of the finger support structure; and a first finger comprising:

a first receiving component to releasably couple to the first guide of the first finger support structure; and a second receiving component to releasably couple to the first guide of the second finger support structure.

16. The parallel gripper of claim 15, further comprising:

a second finger support structure comprising:

a first guide extending downward from the first end of the second finger support structure;

a second guide extending downward from the first end of the second finger support structure;

a latching mechanism positioned above the first guide and the second guide of the second finger support structure and extending horizontally from the first end of the second finger support structure; and a second finger comprising:

a first receiving components to releasably couple to the first guides of the second finger support structure; and a second receiving components to releasably couple to the second guides of the second finger support structure.

17. The parallel gripper of claim 16, wherein:

the first finger further comprising a first spring loaded latch, the first spring loaded latch to releasably couple to the first latching mechanism of the first finger support structure; and the second finger further comprising a second spring loaded latch, the second spring loaded latch to releasably couple to the second latching mechanism of the second finger support structure.

18. The parallel gripper of claim 15, wherein the first pulley is a driving pulley and the second pulley is an idler pulley and the gripper further comprises:

a pinion pulley coupled to a shaft of a motor;

a spur pulley concentrically coupled to the driving pulley; and a second closed-loop timing belt tensioned by the pinion pulley and the spur pulley.

19. The parallel gripper of claim 15, wherein the first guide and the second guide of the first finger support structure are respectively moved horizontally within the first receiving component and the second receiving component from the first portion to a second portion to disengage the latch release mechanism and couple the first finger to the first finger support structure.

20. The robotic system as recited in claim 1, wherein the one or more guides of the first finger support structure include at least a first guide and a second guide.

* * * * *